(12) United States Patent
Liu et al.

(10) Patent No.: US 11,686,341 B2
(45) Date of Patent: Jun. 27, 2023

(54) FOIL BEARING ASSEMBLY INCLUDING SEGMENTED INNER FOIL ASSEMBLY AND COMPRESSOR INCLUDING SAME

(71) Applicant: Emerson Climate Technologies, Inc., Sidney, OH (US)

(72) Inventors: Zheji Liu, Tipp City, OH (US); Michael M. Perevozchikov, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 86 days.

(21) Appl. No.: 17/167,611

(22) Filed: Feb. 4, 2021

(65) Prior Publication Data
US 2022/0243762 A1    Aug. 4, 2022

(51) Int. Cl.
  *F16C 17/02*     (2006.01)
  *F16C 43/02*     (2006.01)
  *F04D 29/05*     (2006.01)
  *F04D 29/057*    (2006.01)

(52) U.S. Cl.
  CPC .......... *F16C 17/024* (2013.01); *F04D 29/057* (2013.01); *F16C 43/02* (2013.01)

(58) Field of Classification Search
  CPC ....... F16C 17/024; F16C 43/02; F04D 29/057
  See application file for complete search history.

(56) References Cited

U.S. PATENT DOCUMENTS

| | | | |
|---|---|---|---|
| 4,795,274 A | 1/1989 | Gu | |
| 5,498,083 A | 3/1996 | Brown | |
| 5,902,049 A * | 5/1999 | Heshmat | F16C 27/02 384/106 |
| 5,915,841 A | 6/1999 | Weissert | |
| 2005/0163407 A1 | 7/2005 | Kang et al. | |
| 2007/0047858 A1 | 3/2007 | Hurley et al. | |
| 2014/0341710 A1* | 11/2014 | Creamer | F04D 27/007 415/203 |
| 2015/0275967 A1* | 10/2015 | Ryu | F16C 33/04 384/116 |

(Continued)

OTHER PUBLICATIONS

PCT International Search Report and Written Opinion of the International Searching Authority dated Apr. 25, 2022 regarding PCT/US2022/013811; pp. 1-26.

*Primary Examiner* — Alan B Waits
(74) *Attorney, Agent, or Firm* — Armstrong Teasdale LLP

(57) ABSTRACT

A bearing system includes a bearing housing and a foil bearing assembly. The bearing housing includes a sleeve that defines a cylindrical bore and includes at least one bearing assembly locking feature, and a mounting structure. The foil bearing assembly includes an outer foil assembly, an inner foil assembly, and a bump foil assembly positioned between the outer foil assembly and the inner foil assembly. The outer foil assembly includes at least one outer foil pad that extends circumferentially from a first end including a bearing retention feature to a second end. The bearing retention feature is cooperatively engaged with the at least one bearing assembly locking feature. The inner foil assembly includes a plurality of circumferentially-spaced inner foil pads. Each inner foil pad extends circumferentially from a tab to a free end. At least one inner foil pad is welded to the outer foil assembly along the tab.

20 Claims, 21 Drawing Sheets

(56) References Cited

U.S. PATENT DOCUMENTS

| | | | |
|---|---|---|---|
| 2016/0369838 A1* | 12/2016 | Rocchi | F16C 17/024 |
| 2016/0377114 A1* | 12/2016 | Dahinten | F16C 43/02 |
| | | | 384/106 |
| 2020/0256343 A1* | 8/2020 | Sakota | F04D 29/5826 |
| 2020/0291953 A1* | 9/2020 | Perevozchikov | F04D 29/053 |

* cited by examiner

FOIL BEARING ASSEMBLY INCLUDING SEGMENTED INNER FOIL ASSEMBLY AND COMPRESSOR INCLUDING SAME

FIELD

The field of the disclosure relates generally to bearing systems, and more particularly, to gas foil bearing assemblies for use in compressors.

BACKGROUND

Some refrigerants used in modern refrigeration and cooling systems, such as R134a or other low global warming potential (GWP) refrigerants, have a relatively low density which requires higher volume flow compressors such as centrifugal compressors.

Centrifugal compressors typically include compressor bearings to support a driveshaft used to transfer power from the motor to the impeller that imparts kinetic energy to incoming refrigerant. The compressor bearings are typically provided with one or more features to reduce friction between the compressor bearing and the driveshaft. The design of these friction-reducing features of the bearings pose an on-going challenge due at least in part to the refrigerant and the challenging operating environment within gas compressors such as air conditioning compressors.

Some compressor bearings in existing refrigerant compressors use oil or alternative compositions as a lubricant, but some refrigerants are incompatible with at least some existing lubricant compositions. Other compressor bearings are oil-free magnetic bearings that levitate the driveshaft within a magnetic field provided by high-strength magnets, but magnetic bearings are typically complex in design, add significant weight, require complicated control, and limit the choice of driveshaft materials to ferromagnetic materials in order to respond to the magnetic fields within the magnetic bearings. Another type of oil-free bearings is a foil bearing that includes compliant foil elements that surround the driveshaft and support the driveshaft on a fluid layer formed between the driveshaft and the foil elements when the rotation speed of the driveshaft exceeds a threshold speed termed liftoff speed. Foil bearings are well-suited for the high-speed operating environment typical of centrifugal compressors, are compatible with all refrigerant compositions, and may be used with a wider variety of driveshaft materials, thereby permitting the use of lighter-weight materials to reduce the amount of energy needed to operate the compressor.

At least one consideration when using foil bearing assemblies in centrifugal compressors is sub-synchronous vibrations—i.e., vibrations occurring at a frequency below that of the rotational frequency of the shaft or other rotor supported by the bearings. Centrifugal compressors that incorporate foil bearing assemblies can be prone to sub-synchronous vibrations, which can reduce the operating envelope of the compressor.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a bearing system includes a bearing housing and a foil bearing assembly. The bearing housing includes a sleeve that defines a cylindrical bore and includes at least one bearing assembly locking feature, and a mounting structure for connecting the bearing system to a compressor housing. The foil bearing assembly is positioned within the cylindrical bore and includes an outer foil assembly, an inner foil assembly, and a bump foil assembly positioned between the outer foil assembly and the inner foil assembly. The outer foil assembly includes at least one outer foil pad extending circumferentially from a first end including a bearing retention feature to a second end. The bearing retention feature is cooperatively engaged with the at least one bearing assembly locking feature to maintain the foil bearing assembly within the bearing housing at a fixed rotational position. The inner foil assembly includes a plurality of inner foil pads spaced circumferentially about the foil bearing assembly. Each inner foil pad extends circumferentially from a tab to a free end. At least one of the inner foil pads is welded to the outer foil assembly along the tab.

In another aspect, a compressor includes a compressor housing, a driveshaft rotatably supported within the compressor housing, an impeller connected to the driveshaft and operable to impart kinetic energy to incoming refrigerant gas upon rotation of the driveshaft, a bearing housing mounted to the compressor housing, and a foil bearing assembly rotatably supporting the driveshaft. The bearing housing includes a sleeve that defines a cylindrical bore and includes at least one bearing assembly locking feature. The foil bearing assembly is positioned within the cylindrical bore, and includes an outer foil assembly, an inner foil assembly, and a bump foil assembly positioned between the outer foil assembly and the inner foil assembly. The outer foil assembly includes at least one bearing retention feature cooperatively engaged with the at least one bearing assembly locking feature to maintain the foil bearing assembly within the bearing housing at a fixed rotational position. The inner foil assembly includes a plurality of inner foil pads spaced circumferentially about the foil bearing assembly. Each inner foil pad extends circumferentially from a tab to a free end. At least one of the inner foil pads is welded to the outer foil assembly along the tab.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

Figure 1:
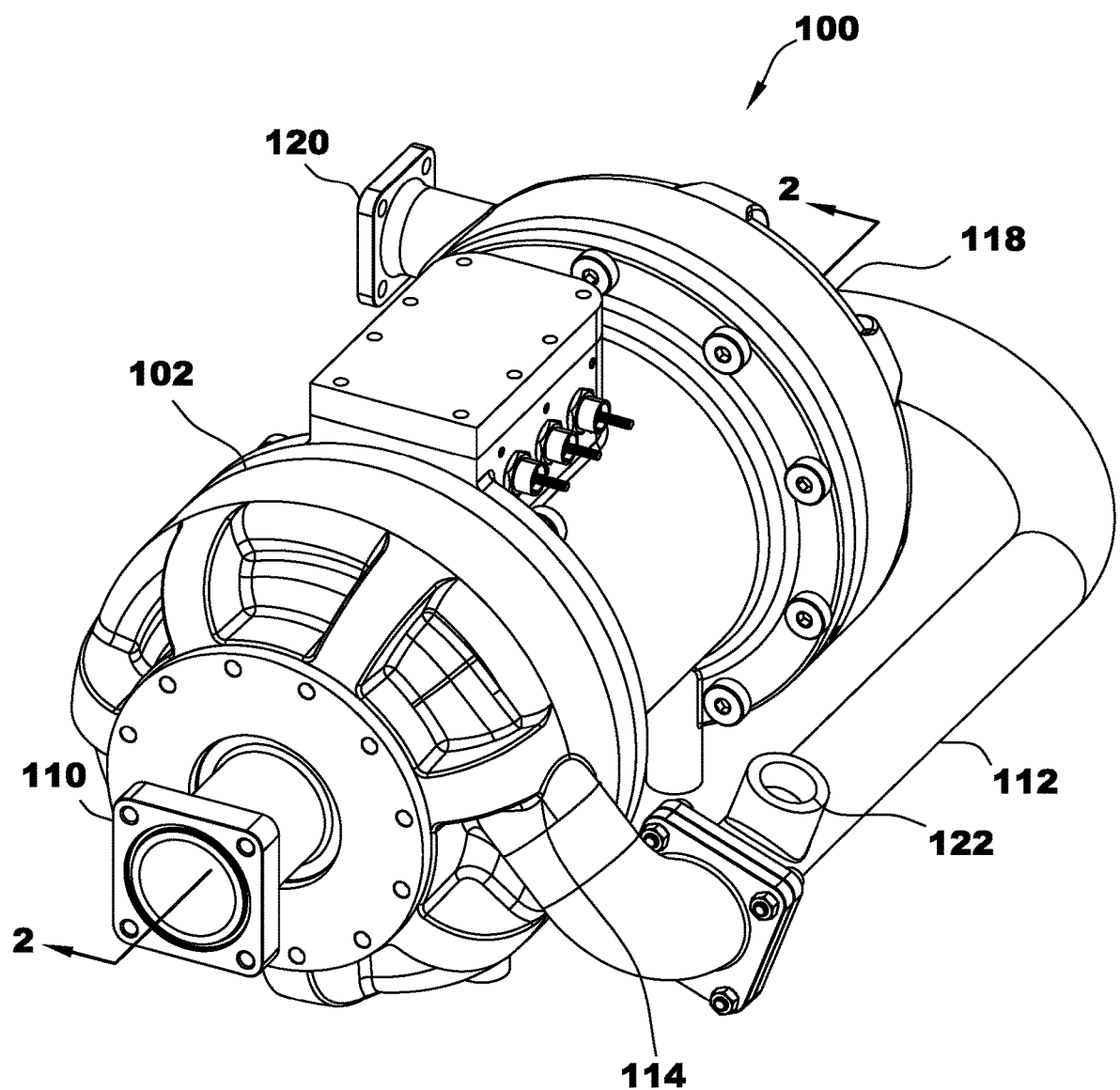
FIG. 1 is a perspective view of an assembled compressor.

Referring to FIG. 1, a compressor illustrated in the form of a two-stage refrigerant compressor is indicated generally at 100. The compressor 100 generally includes a compressor housing 102 forming at least one sealed cavity within which each stage of refrigerant compression is accomplished. The compressor 100 includes a first refrigerant inlet 110 to introduce refrigerant vapor into the first compression stage (not labeled in FIG. 1), a first refrigerant exit 114, a refrigerant transfer conduit 112 to transfer compressed refrigerant from the first compression stage to the second compression stage, a second refrigerant inlet 118 to introduce refrigerant vapor into the second compression stage (not labeled in FIG. 1), and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor 100 is incorporated. The refrigerant transfer conduit 112 may further include a refrigerant port 122, for example, for economization.

Figure 2:
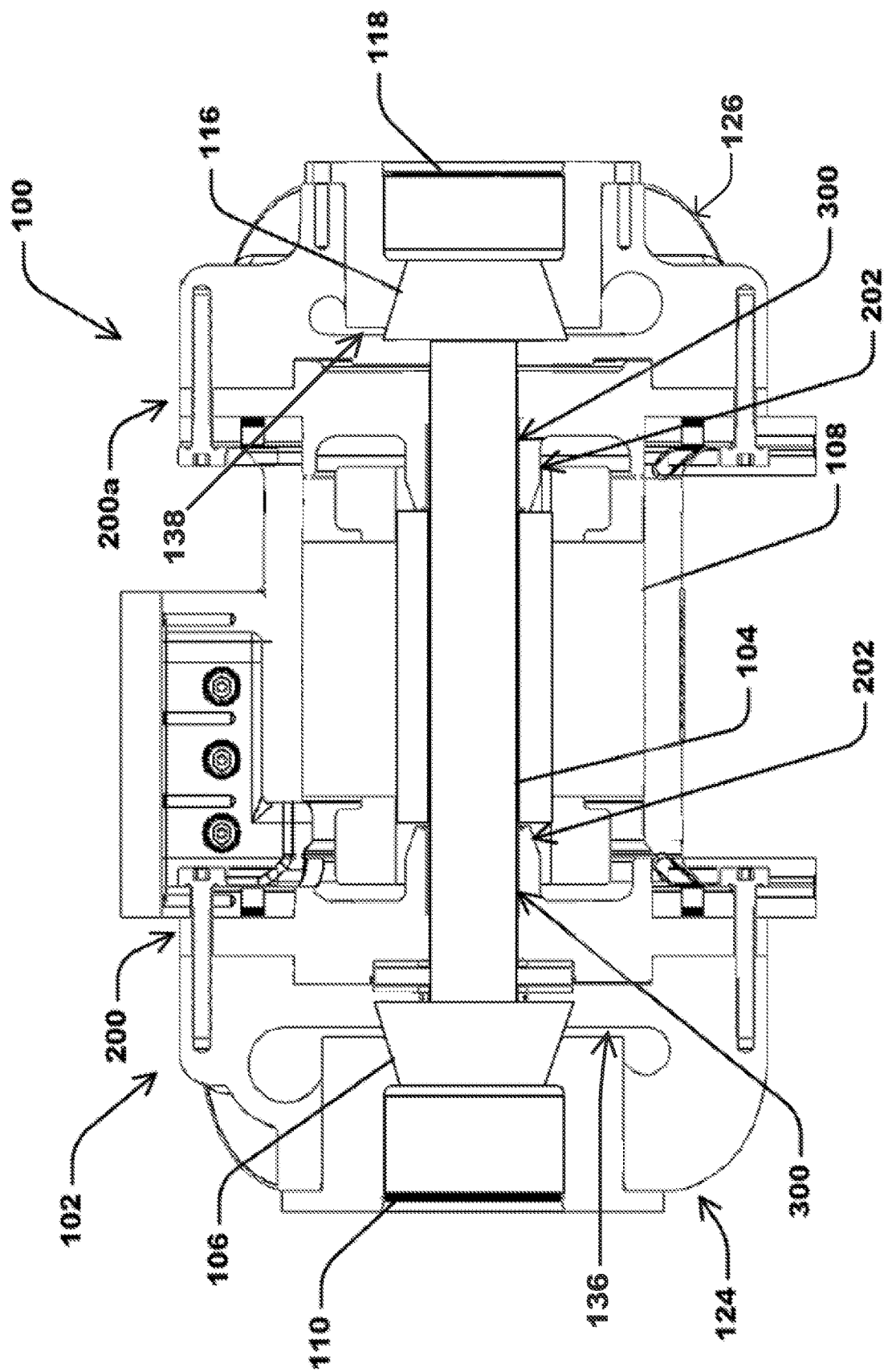
FIG. 2 is a cross-sectional view of the compressor of FIG. 1 taken along line 2-2, with the external conduit removed.

Referring to FIG. 2, the compressor housing 102 encloses a first compression stage 124 and a second compression stage 126 at opposite ends of the compressor 100. The first compression stage 124 includes a first impeller 106 configured to add kinetic energy to refrigerant entering via the first refrigerant inlet 110. The kinetic energy imparted to the refrigerant by the first impeller 106 is converted to increased refrigerant pressure (i.e. compression) as the refrigerant velocity is slowed upon transfer to a diffuser 136. Similarly, the second compression stage 126 includes a second impeller 116 configured to add kinetic energy to refrigerant transferred from the first compression stage 124 entering via the second refrigerant inlet 118. The kinetic energy imparted to the refrigerant by the second impeller 116 is converted to increased refrigerant pressure (i.e. compression) as the refrigerant velocity is slowed upon transfer to a diffuser 138. Compressed refrigerant exits the second compression stage 126 via the second refrigerant exit 120 (not shown in FIG. 2).

Figure 3:
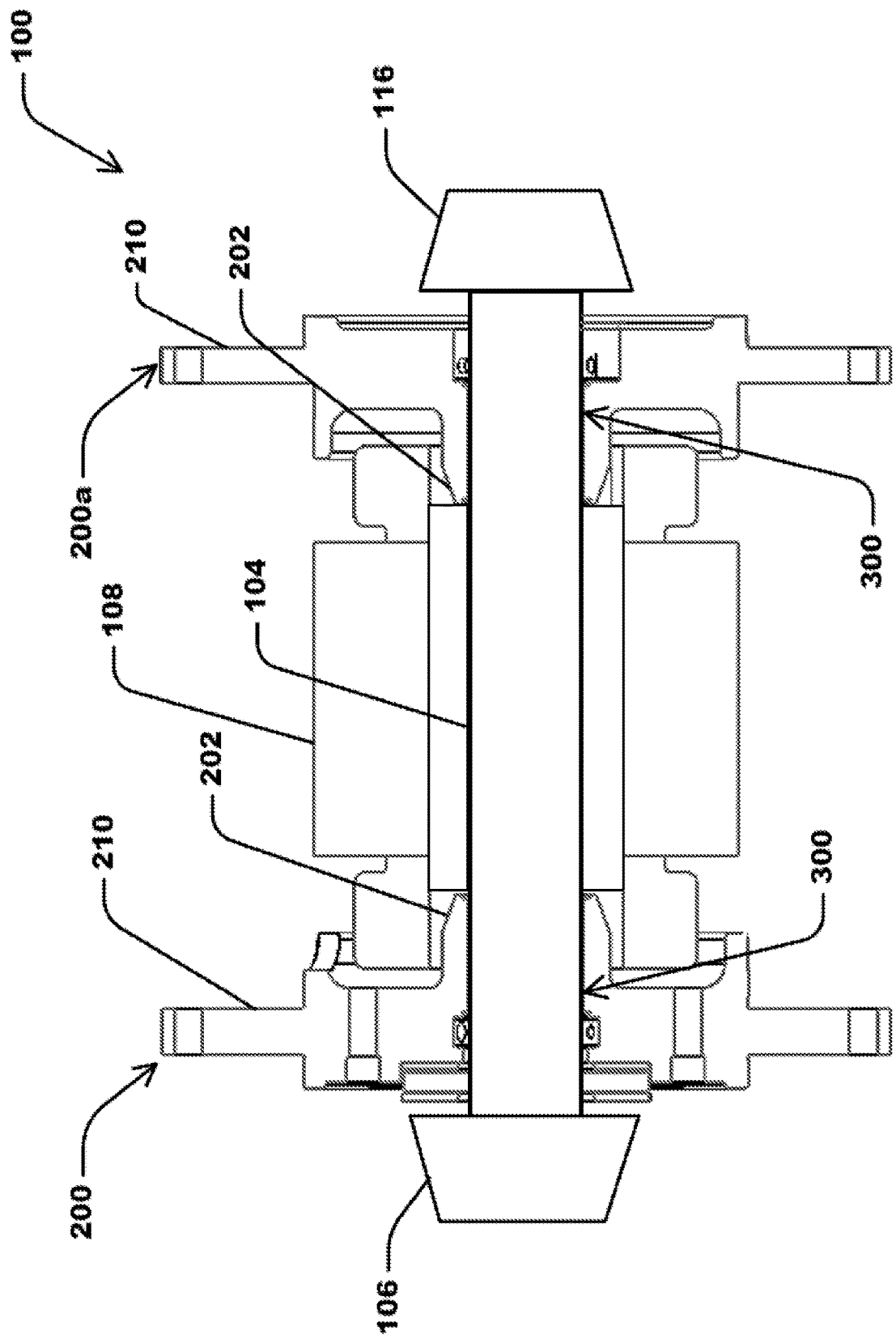
FIG. 3 is a cross-sectional view of the compressor of FIG. 2 with the external compressor housing removed.

Referring to FIG. 2 and FIG. 3, the first stage impeller 106 and second stage impeller 116 are connected at opposite ends of a driveshaft 104. The driveshaft 104 is operatively connected to a motor 108 positioned between the first stage impeller 106 and second stage impeller 116 such that the first stage impeller 106 and second stage impeller 116 are rotated at a rotation speed selected to compress the refrigerant to a pre-selected pressure exiting the second refrigerant exit 120. Any suitable motor may be incorporated into the compressor 100 including, but not limited to, an electrical motor. The driveshaft 104 is supported by gas foil bearing assemblies 300 positioned within a sleeve 202 of each bearing housing 200/200a, as described in additional detail below. Each bearing housing 200/200a includes a mounting structure 210 for connecting the respective bearing housing 200/200a to the compressor housing 102, as illustrated in FIG. 2.

Figure 4:
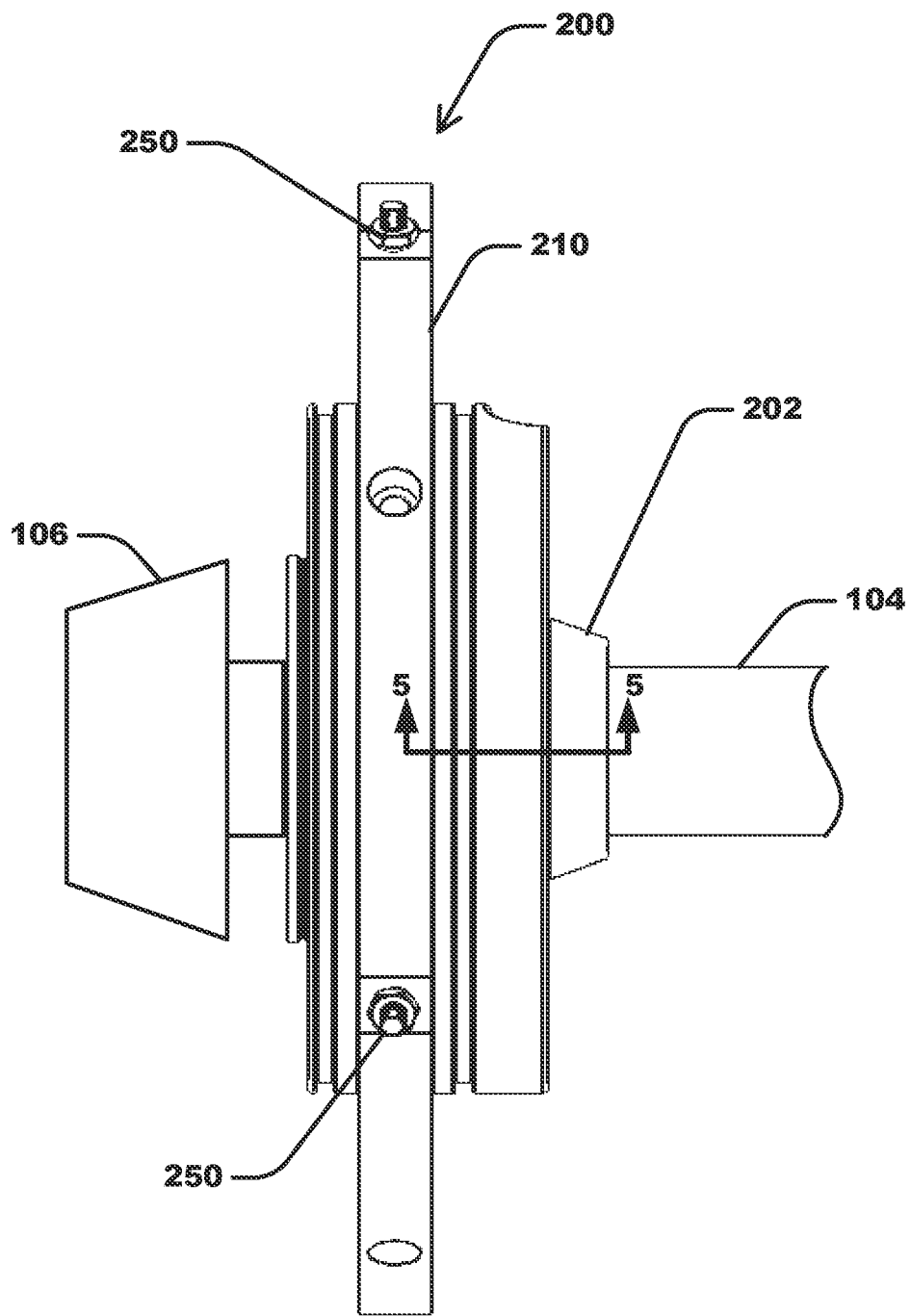
FIG. 4 is a side view of an impeller mounted to an end of a driveshaft in which the driveshaft is supported by a bearing housing.
Figure 5:
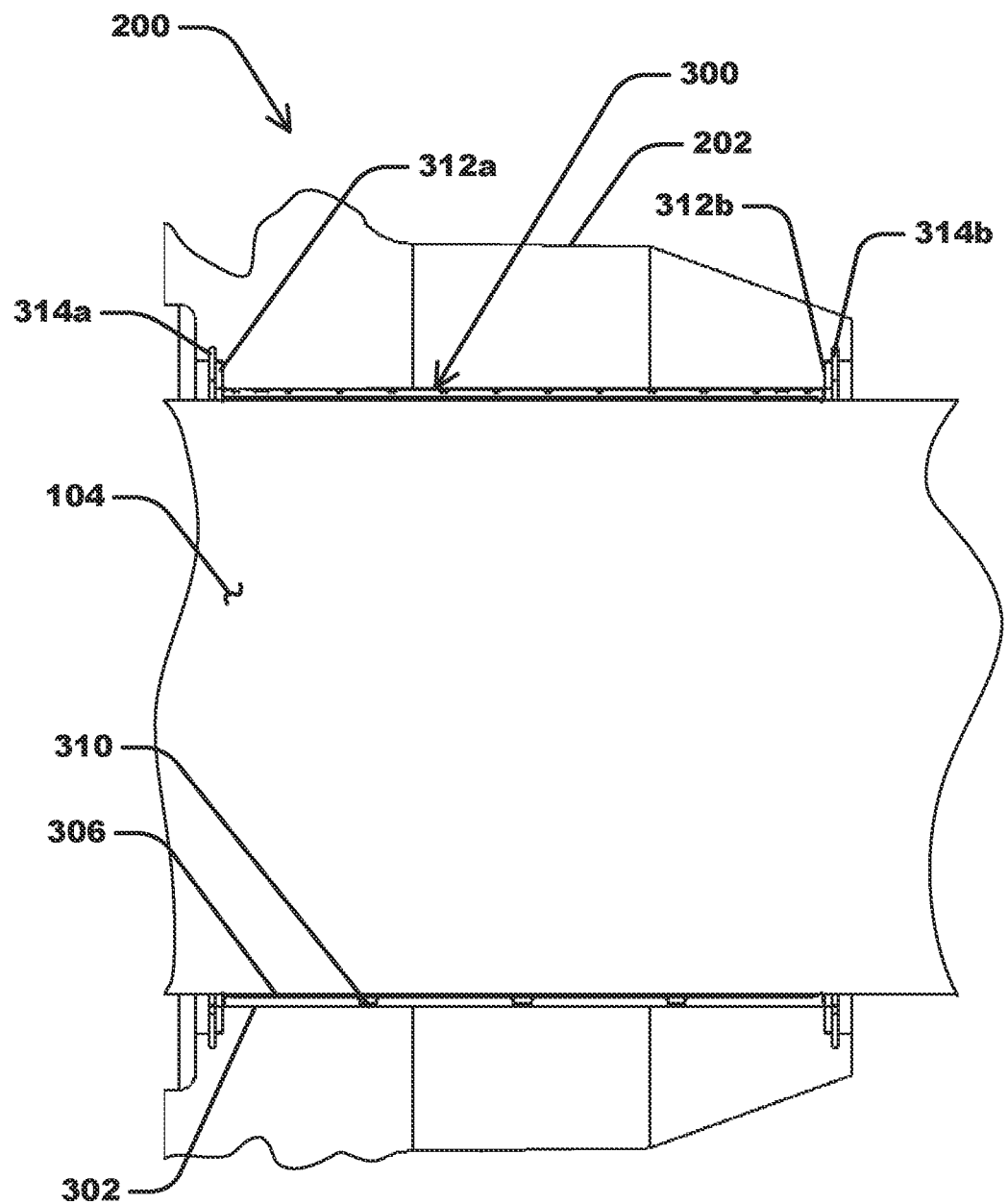
FIG. 5 is a cross-sectional view through a sleeve of the bearing housing shown in FIG. 4 taken along line 5-5, illustrating the driveshaft supported within a foil bearing assembly maintained within the sleeve of the bearing housing using a pair of retaining clips.
Figure 7:
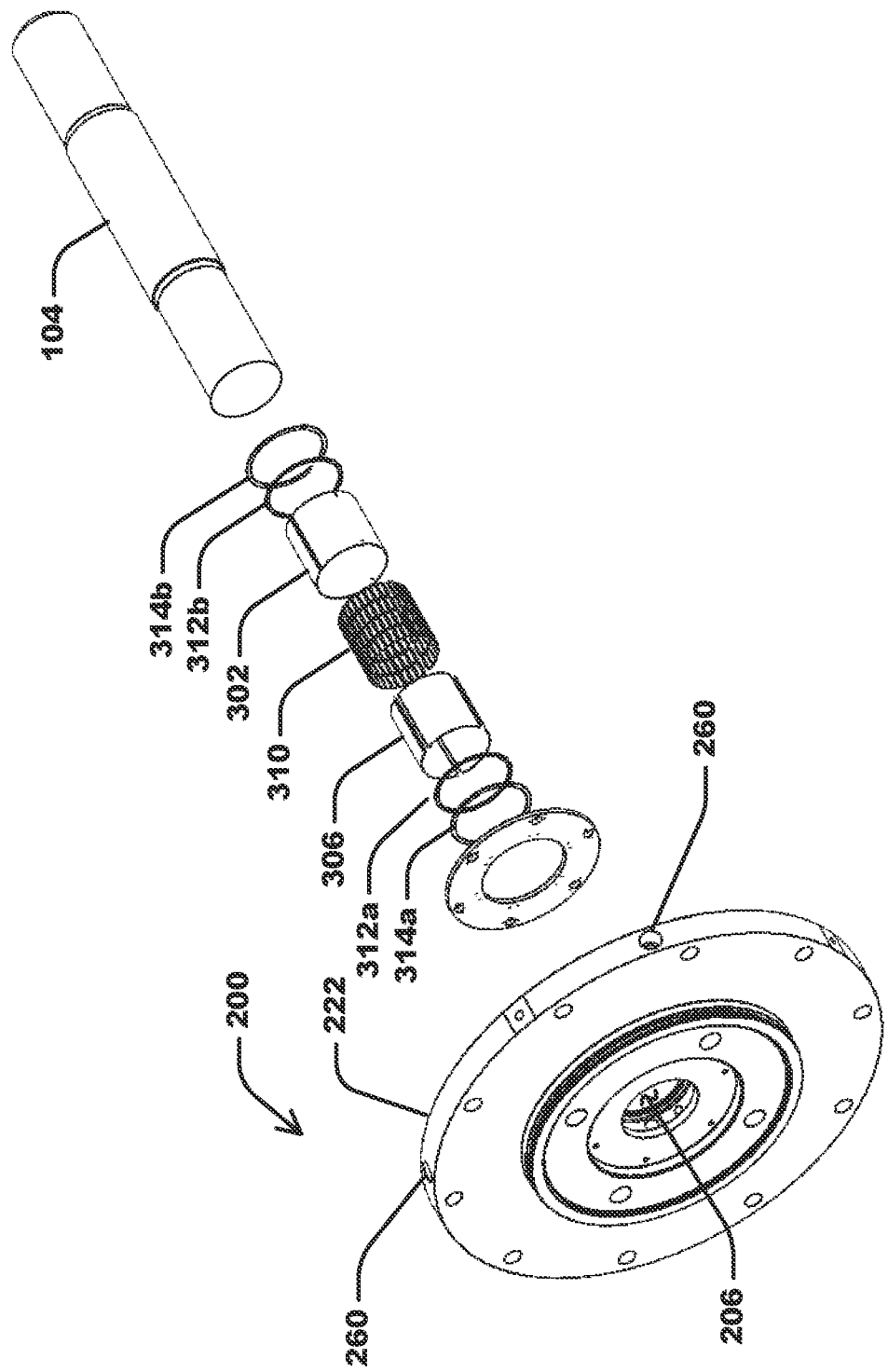
FIG. 7 is an exploded view showing the arrangement of elements of the foil bearing assembly with respect to the bearing housing and the driveshaft.

Referring to FIG. 4, each bearing housing 200/200a (only bearing housing 200 illustrated in FIG. 4) supports the driveshaft 104, and the driveshaft 104 projects through the bearing housing 200/200a opposite the sleeve 202, and the impeller 106 is connected to the projecting end of the driveshaft 104. Referring to FIG. 5 and FIG. 7, the gas foil bearing assembly 300 is positioned within a cylindrical bore 206 within the bearing housing 200. The driveshaft 104 closely fits within the gas foil bearing assembly 300, which includes an outer compliant foil assembly or foil layer 302 positioned adjacent to the inner wall of the sleeve 202, an inner compliant foil assembly or foil layer 306 (also referred to as a "top foil") positioned adjacent to the driveshaft 104, and a bump foil assembly or foil layer 310 positioned between the inner foil layer 306 and the outer foil layer 302. The foil assemblies or layers 302/306/310 of the gas foil bearing assembly 300 form an essentially cylindrical tube sized to receive the driveshaft 104 with relatively little or no gap design as determined by existing foil bearing design methods. The components of the foil bearing assembly 300, such as outer foil layer 302, the inner foil layer 306, and the bump foil layer 310, may be constructed of any suitable material that enables the foil bearing assembly 300 to function as described herein. Suitable materials include, for example and without limitation, metal alloys. In some embodiments, for example, each of the outer foil layer 302, the inner foil layer 306, and the bump foil layer 310 is constructed of stainless steel (e.g., 17-4 stainless steel). The foil layers can be formed from relatively thin sheets or "foils" of material. For example, the foil assemblies or layers 302/306/310 can be constructed of metal sheets having a thickness in the range of 0.003 inches to 0.007 inches.

Figure 8:
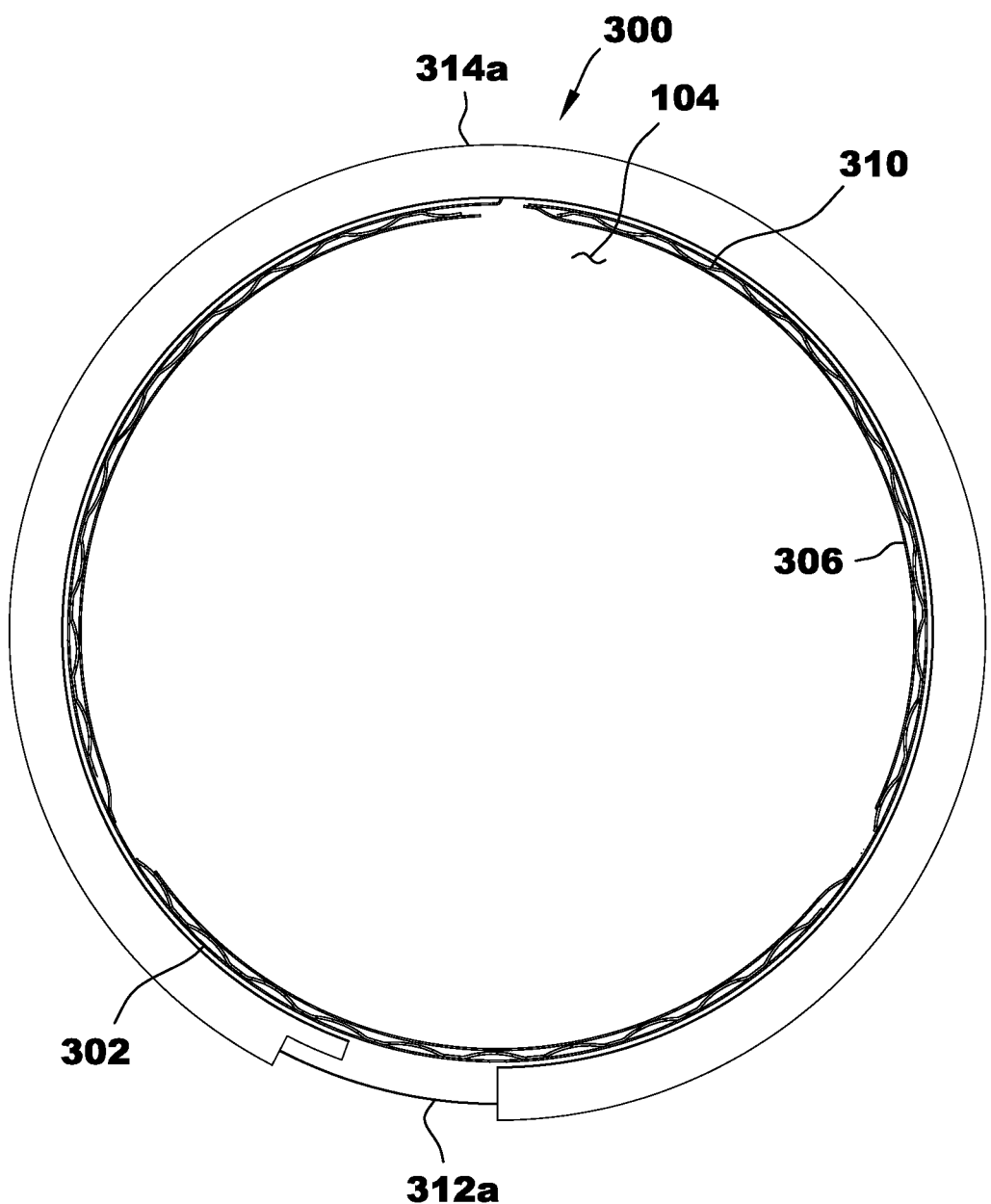
FIG. 8 is a front view of the foil bearing assembly shown in FIGS. 5 and 7.

Referring again to FIG. 5, the foil bearing assembly 300 in the illustrated embodiment further includes a pair of foil keepers 312a/312b positioned adjacent opposite ends of the layers 302/306/310 to inhibit sliding of the layers 302/306/310 in an axial direction within the cylindrical bore 206 of the sleeve 202. A pair of foil retaining clips 314a/314b positioned adjacent to the foil keepers 312a/312b, respectively, fix the layers 302/306/310 in a locked axial position within the cylindrical bore 206. Foil retaining clips 314a/314b may be removably connected to bearing housing 200. FIG. 8 further illustrates the arrangement of the foil keeper 312a and foil retaining clip 314a at one end of the foil bearing assembly 300.

Figure 6:
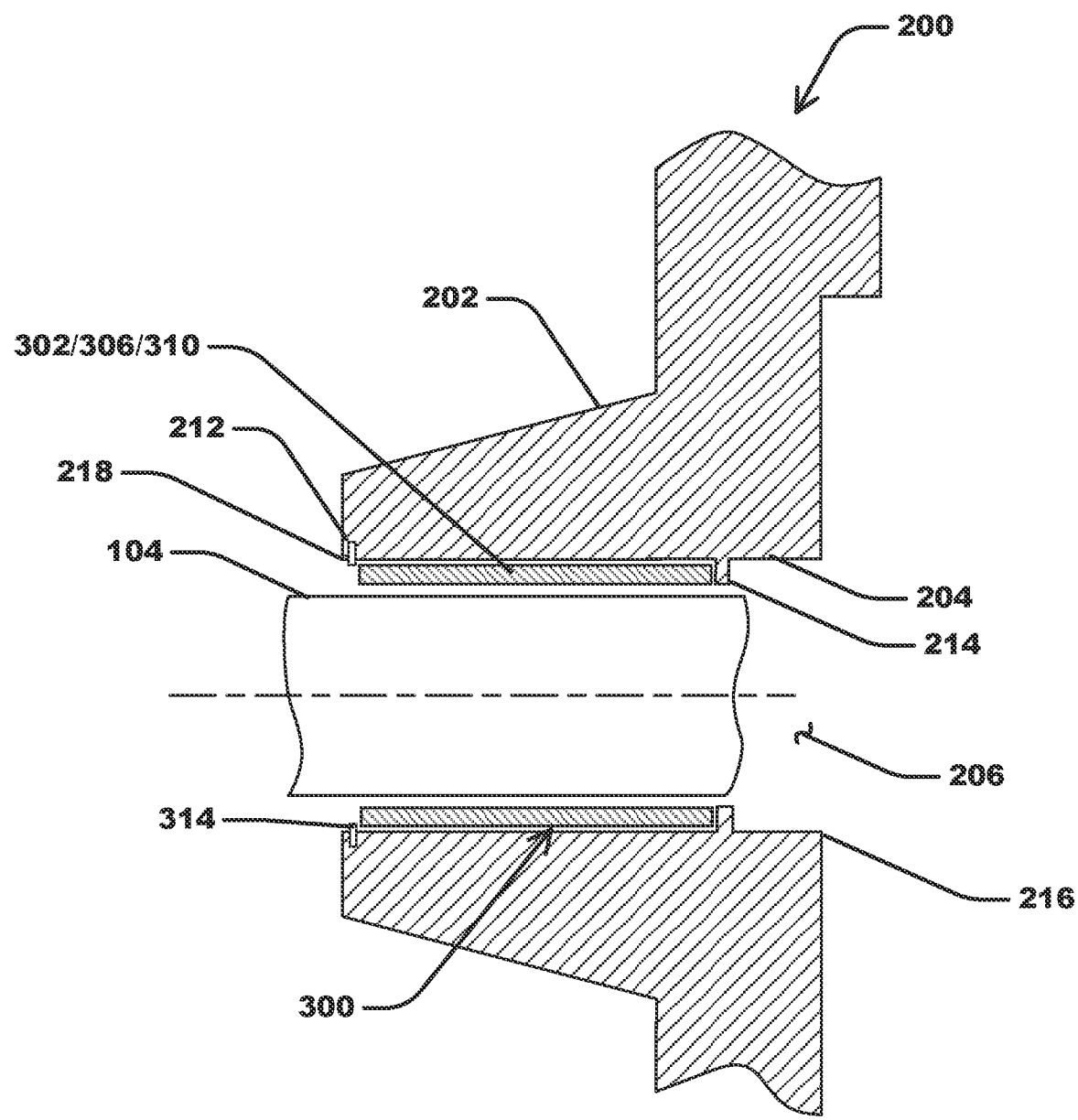
FIG. 6 is a cross-sectional view of another embodiment of a bearing housing suitable for use in the compressor of FIG. 1, illustrating the driveshaft supported within a foil bearing assembly maintained within the bearing housing between a retaining lip formed within the bearing housing at one end and a retaining clip at an opposite end.

In other embodiments, as illustrated in FIG. 6, each bearing housing 200/200a (only bearing housing 200 illustrated in FIG. 6) includes a foil retaining lip 214 formed integrally (e.g., cast) with the bearing housing 200 and projecting radially inward from the radial inner surface 204 that defines the cylindrical bore 206. In the illustrated embodiment, the foil retaining lip 214 is positioned near an impeller end 216 of the cylindrical bore 206 proximal to the impeller 116 (shown in FIGS. 2-3). The foil retaining lip 214 is sized and dimensioned to project a radial distance from the radial inner surface 204 that overlaps at least a portion of the layers 302/306/310 of the foil bearing assembly 300. The foil retaining lip 214 may extend fully around the circumference of the radial inner surface 204, or the foil retaining lip can include two or more segments extending over a portion of the circumference of the radial inner surface 204 and separated by spaces flush with the adjacent radial inner surface 204.

Figure 9:
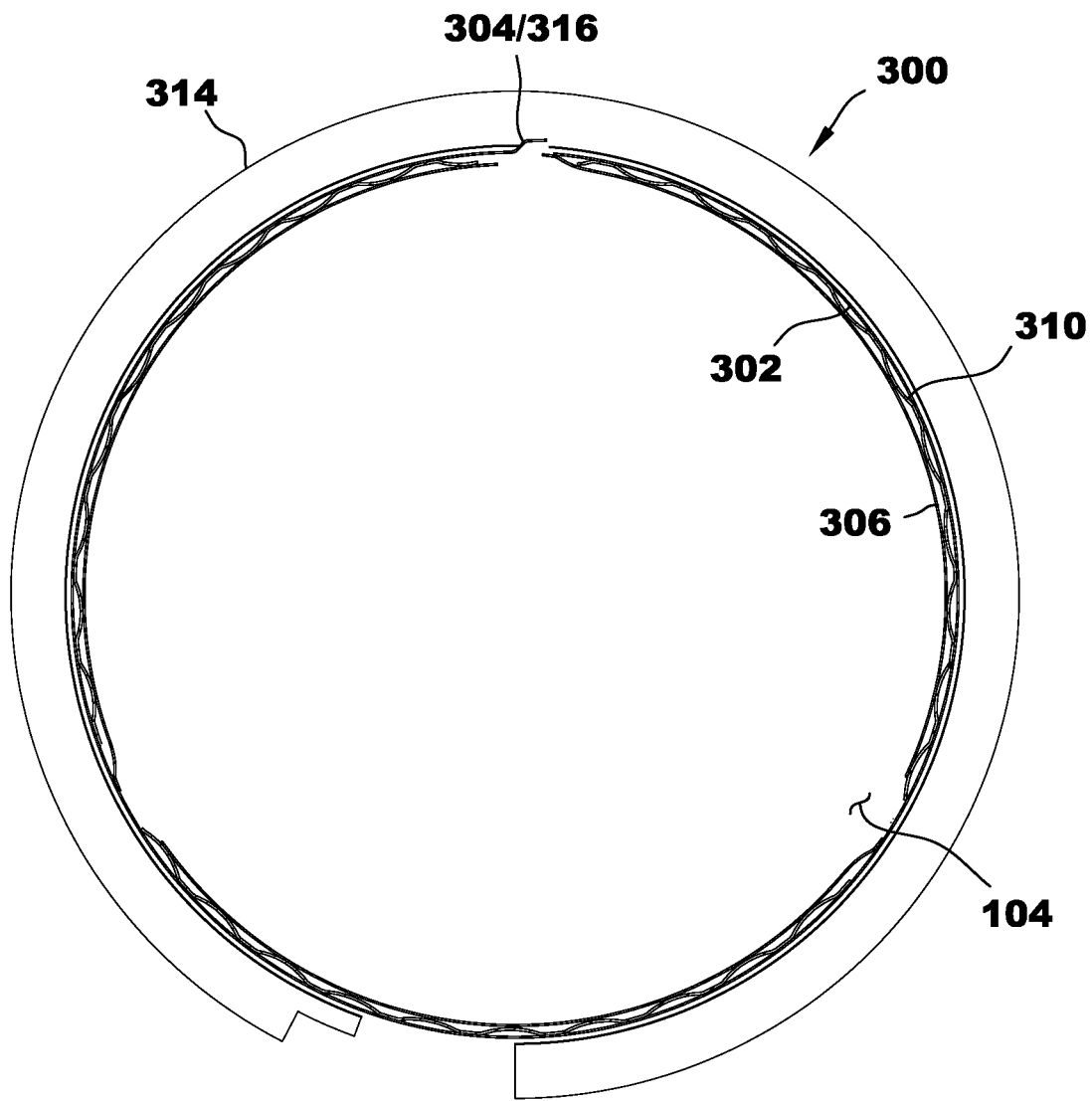
FIG. 9 is a front view of foil bearing assembly shown in FIGS. 6 and 7.
Figure 10:
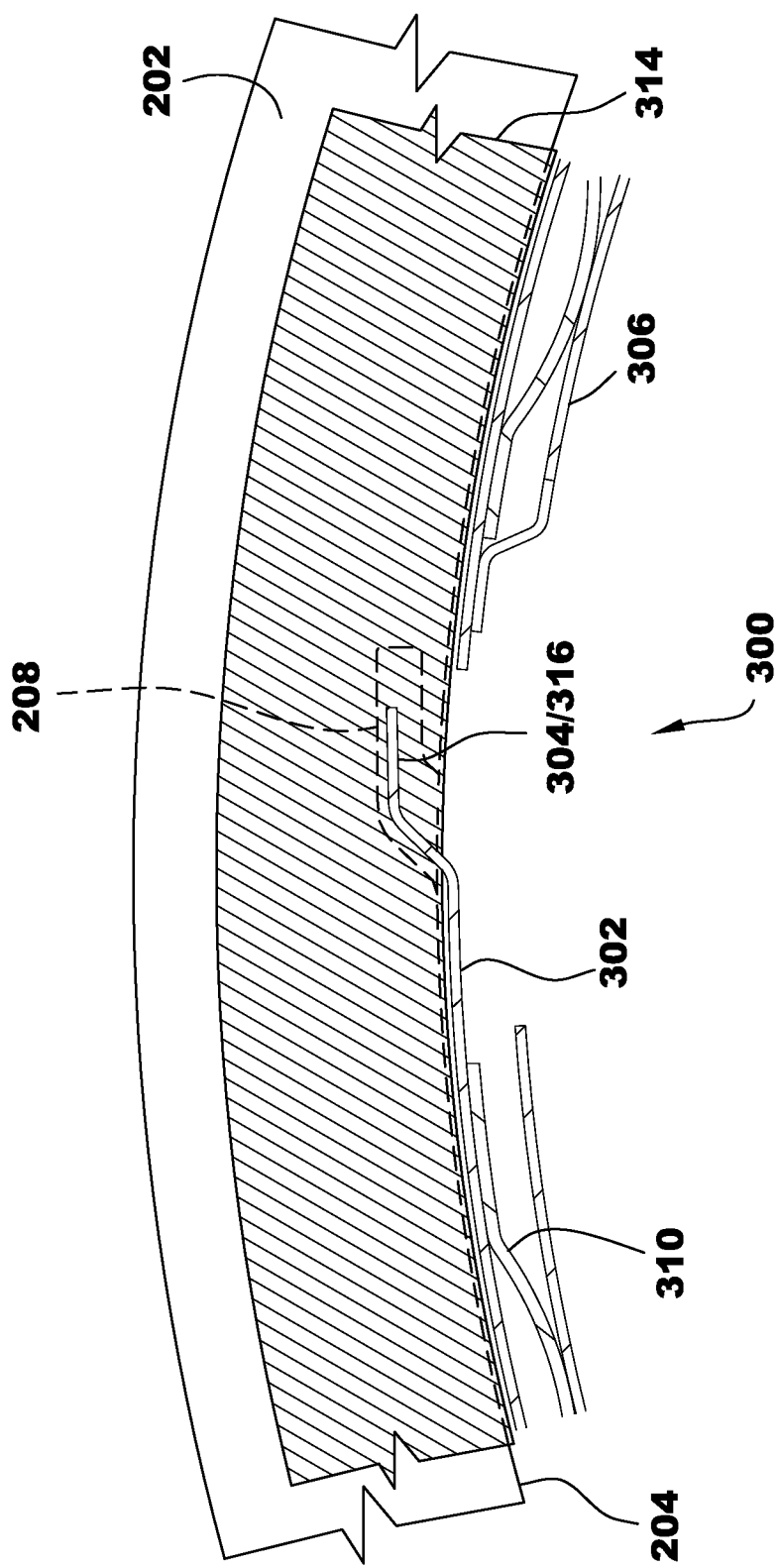
FIG. 10 is an enlarged view of the foil bearing assembly shown in FIG. 9.

The foil bearing assembly 300 of the embodiment illustrated in FIG. 6 further includes a single foil retaining clip 314 positioned adjacent the ends of the layers 302/306/310 opposite the foil retaining lip 214 to inhibit axial movement of the layers 302/306/310 within the cylindrical bore 206 of the sleeve 202. In this embodiment, the foil retaining clip 314 snaps into a circumferential groove 212 formed within the radial inner surface 204 of the cylindrical bore 206 near a motor end 218 of the cylindrical bore 206. FIG. 9 and FIG. 10 further illustrate the arrangement of the foil retaining clip 314 at one end of the foil bearing assembly 300. The foil retaining clip 314 is sized and dimensioned to provide clearance for the outer layer 302, and to overlap with at least one bearing retention feature 304 that forms a radially outward projecting tab 316, as described further below.

The foil retaining lip 214 may be positioned within any region of the cylindrical bore 206 near the impeller end 216 including, without limitation, a position immediately adjacent to the opening of the cylindrical bore 206 at the impeller end 216. Alternatively, the foil retaining lip 214 may be positioned within any region of the cylindrical bore 206 near the motor end 218 including, without limitation, a position immediately adjacent to the opening of the cylindrical bore 206 at the motor end 218. In such embodiments, the foil retaining clip 314 snaps into a circumferential groove 212 formed within the radial inner surface 204 of the cylindrical bore 206 near the impeller end 216, in an arrangement that is essentially the opposite of the arrangement illustrated in FIG. 6.

Referring again to FIG. 6, the foil bearing assembly 300 is installed within the bearing housing 200 by inserting the foil bearing assembly 300 into the cylindrical bore 206 of the bearing housing 200 at the motor end 218. The foil bearing assembly 300 is then advanced axially into the cylindrical bore 206 toward the impeller end 216 until the layers 302/306/310 contact the foil retaining lip 214. The foil retaining clip 314 is then snapped into the circumferential groove 212 near the motor end 218 of the cylindrical bore 206 to lock the foil bearing assembly 300 in place.

In other embodiments, any suitable method for affixing the foil bearing assembly 300 within the sleeve 202 may be used. Non-limiting examples of suitable methods include keepers and retaining clips, adhesives, set screws, and any other suitable affixing method.

Figure 11:
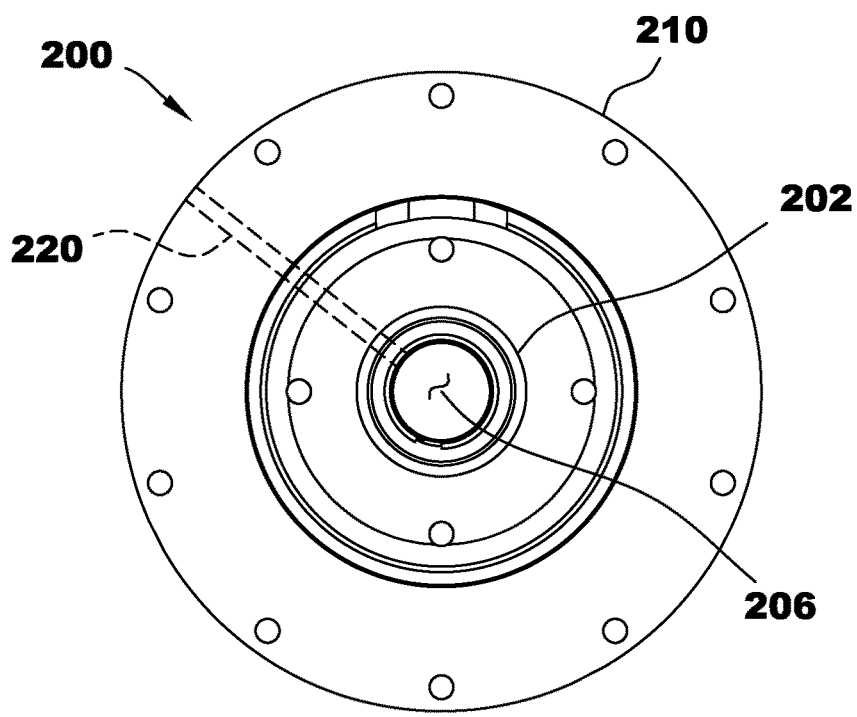
FIG. 11 is a rear view of the bearing housing shown in FIG. 7.
Figure 12:
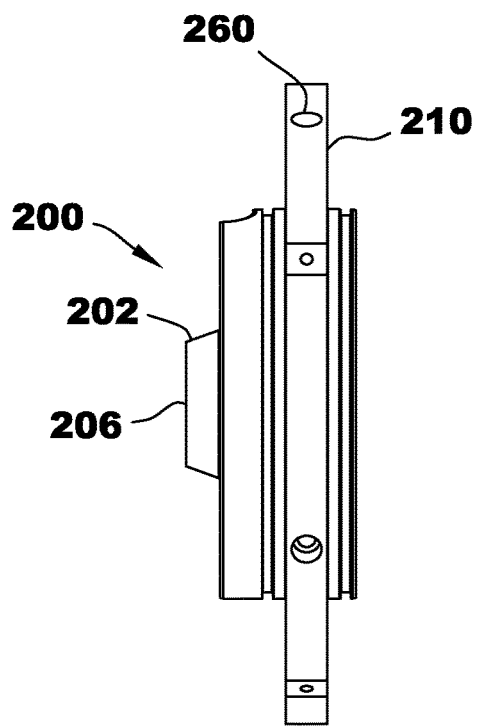
FIG. 12 is a side view of the bearing housing shown in FIG. 7.
Figure 13:
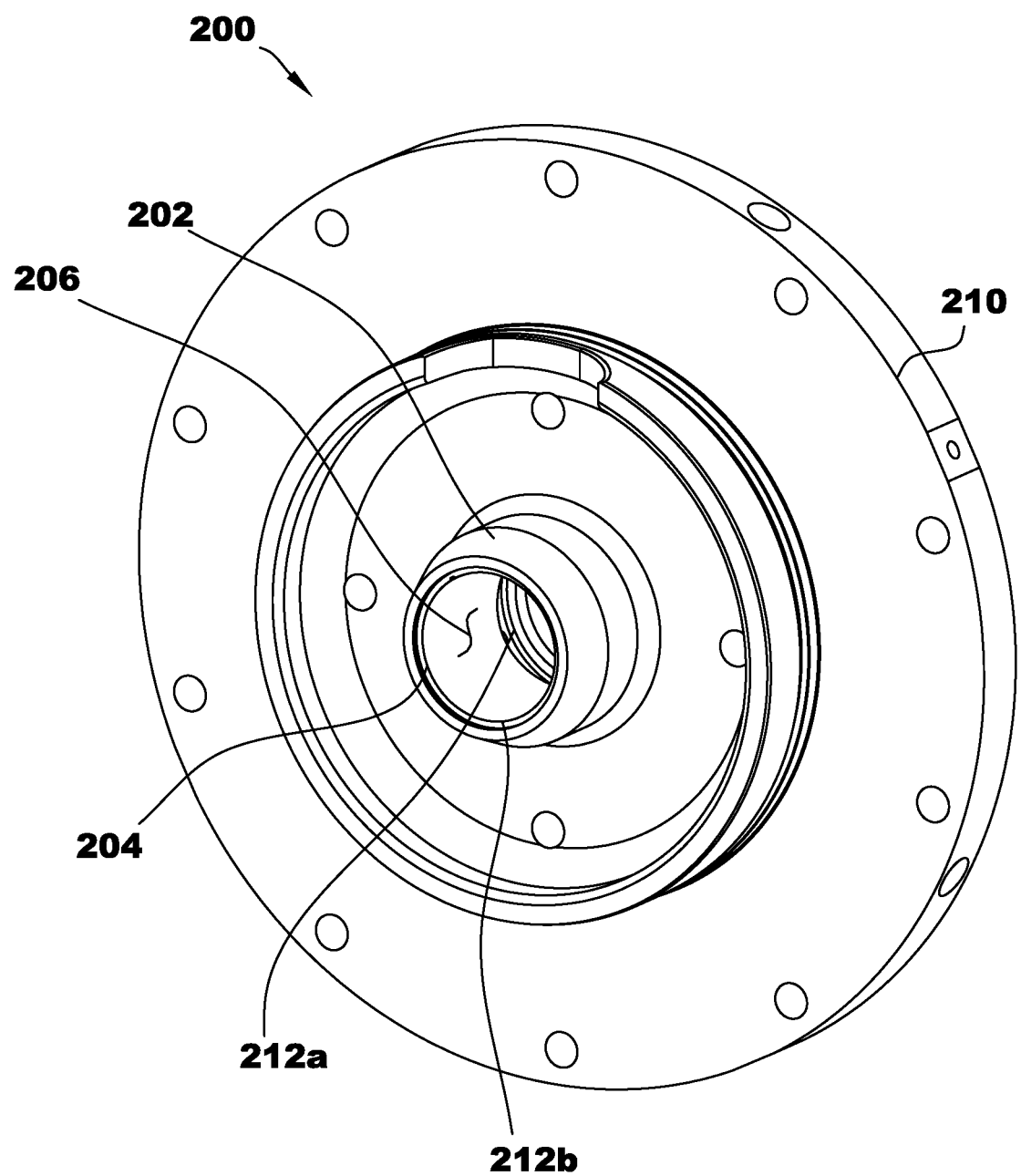
FIG. 13 is a perspective view of the bearing housing shown in FIG. 7.

Referring to FIG. 11, FIG. 12, and FIG. 13, the mounting structure 210 of each bearing housing 200 (only bearing housing 200 illustrated in FIG. 11, FIG. 12, and FIG. 13)/200a connects the respective bearing housing 200/200a to the compressor housing 102 (shown in FIGS. 1 and 2). In the illustrated embodiment, the mounting structure 210 generally projects in a radially outward direction to a dimension matched to the outer dimension of the compressor housing 102. The bearing housing 200 may include any form of mounting structure 210 including, without limitation, an annular flange. The bearing housings 200/200a may further serve as a mounting structure for a variety of elements including, but not limited to, radial bearings, such as the foil bearing assembly 300 described above, a thrust bearing, and sensing devices 250 (shown in FIG. 4) used as feedback for passive or active control schemes such as proximity probes, pressure transducers, thermocouples, key phasers, and the like. The bearing housing 200 may further include external coolant conduits or channels 220 (shown in FIG. 11) to enable active cooling of the foil bearing assembly. The coolant channels 220 can extend, for example, radially outward from the cylindrical bore 206 to an opening 260 formed at a radial outer edge 222 of the bearing housing 200/200a (see also FIG. 7), and can deliver coolant from an external source and/or from the refrigerant system flow to the bearing housing 200/200a and foil bearing assembly 300. Additional details of coolant channels and coolant delivery methods suitable for use with compressor system 100 are described, for example, in U.S. patent application Ser. No. 16/809,836, filed Mar. 5, 2020, the disclosure of which is hereby incorporated by reference in its entirety.

Figure 14:
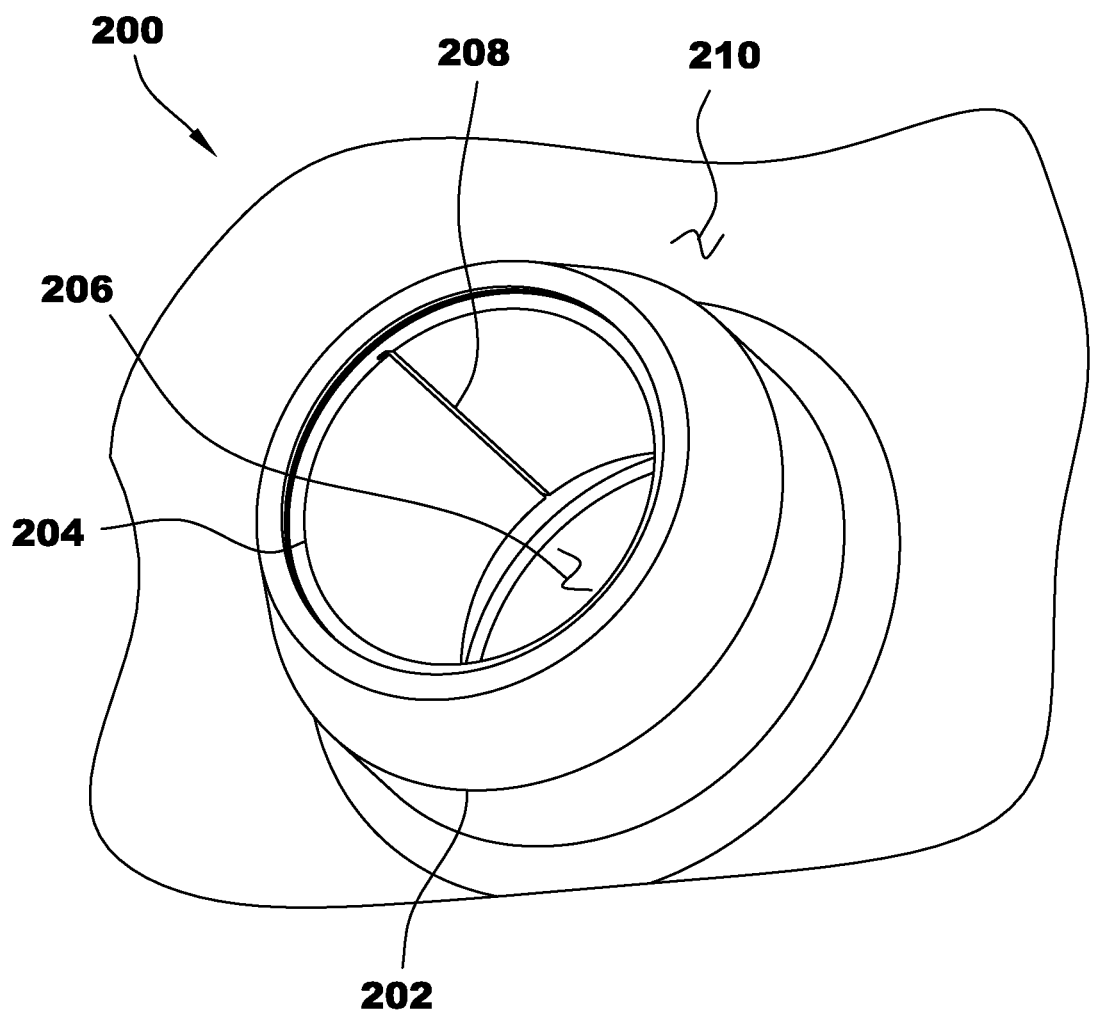
FIG. 14 is an enlarged view of the sleeve of the bearing housing shown in FIG. 10, illustrating the bearing assembly locking feature.

Referring to FIG. 13 and FIG. 14, the bearing housing sleeve 202 has a radial inner surface 204 that defines the cylindrical bore 206. The cross-sectional profile of the cylindrical bore may be essentially circular, or may be any other rounded or polygonal shape without limitation, such as elliptical, square, octagonal, and the like. The radial inner surface 204 is sized and dimensioned to receive the foil bearing assembly 300 such that the outer layer 302 of the foil bearing assembly 300 contacts the radial inner surface 204.

Referring to FIG. 13, the radial inner surface 204 is provided with at least one or more additional features to enable retaining the foil bearing assembly in a fixed axial and rotational position within the sleeve 202. In some embodiments, for example, a first circumferential groove 212a and a second circumferential groove 212b are formed within the radial inner surface 204. The first and second circumferential grooves 212a/212b are sized and dimensioned to receive foil retaining clips 314a and 314b, respectively, as illustrated in FIG. 5. In other embodiments, the first circumferential groove 212a may be replaced by a circumferential foil retaining lip 214 (see FIG. 6).

Referring to FIG. 14, the radial inner surface 204 of the bearing housing 200 is further provided with at least one bearing assembly locking feature 208. The bearing assembly locking feature 208 interlocks with one or more bearing retention features provided on the foil bearing assembly 300 as described below. The bearing assembly locking feature 208 may be any suitable form of mechanically interlocking feature without limitation. Non-limiting examples of suitable mechanically interlocking features include raised features such as an axial ridge, key, or tab, and axial depressions formed within the radial inner surface 204 such as an axially-extending slot, an axially-extending keyhole or keeper as illustrated in FIG. 14. The bearing housing 200 illustrated in FIG. 14 includes a single bearing assembly locking feature 208, though it should be understood that the bearing housing 200 can include more than one bearing assembly locking feature 208. In some embodiments, for example, the radial inner surface 204 of the bearing housing 200 defines a plurality of axially-extending grooves spaced circumferentially along the radial inner surface, each one of the axially-extending grooves sized and shaped to receive a corresponding bearing retention feature of the foil bearing assembly 300.

Figure 15:
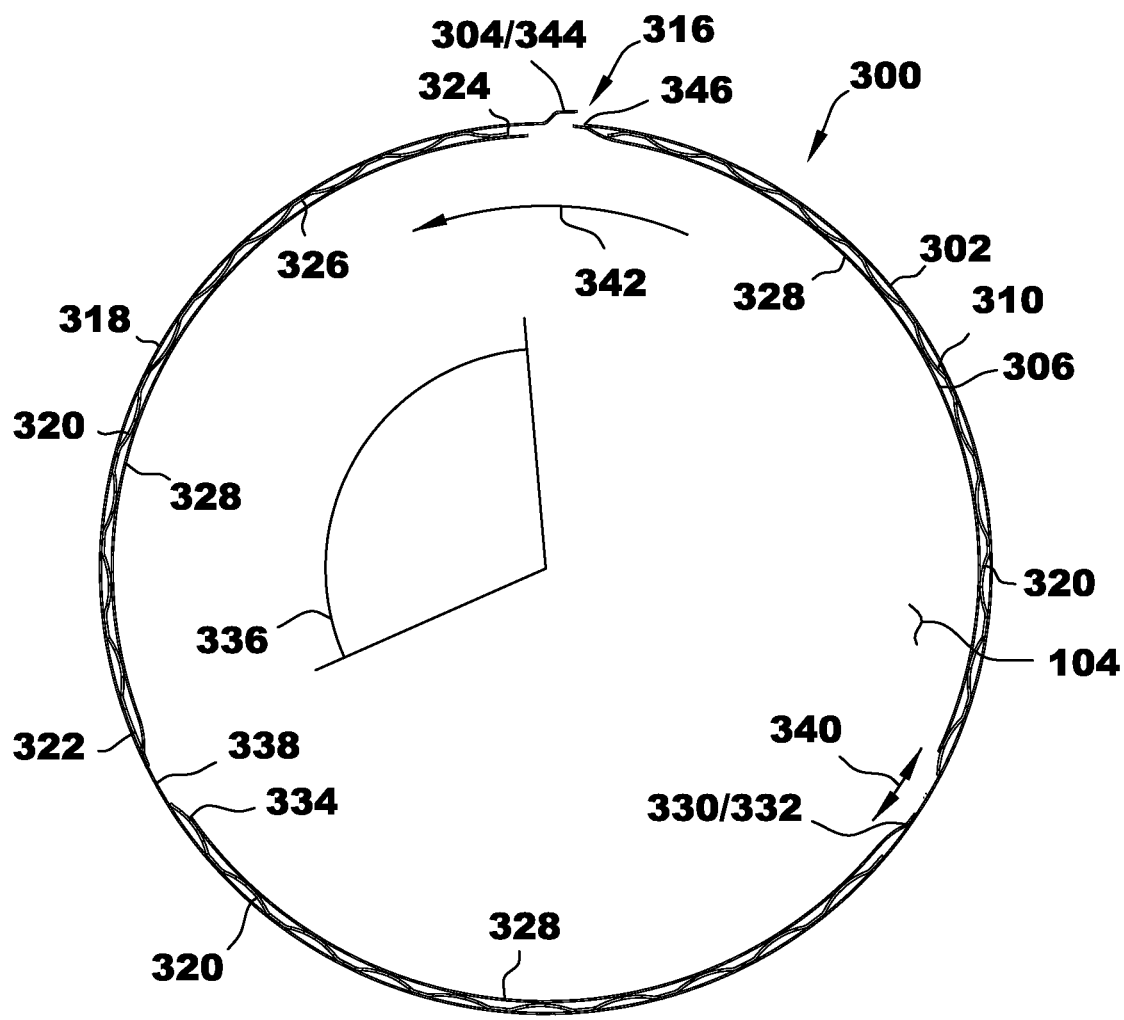
FIG. 15 is a front view of the foil bearing assembly shown in FIG. 8 with the foil keeper and foil retaining clip removed.
Figure 16:
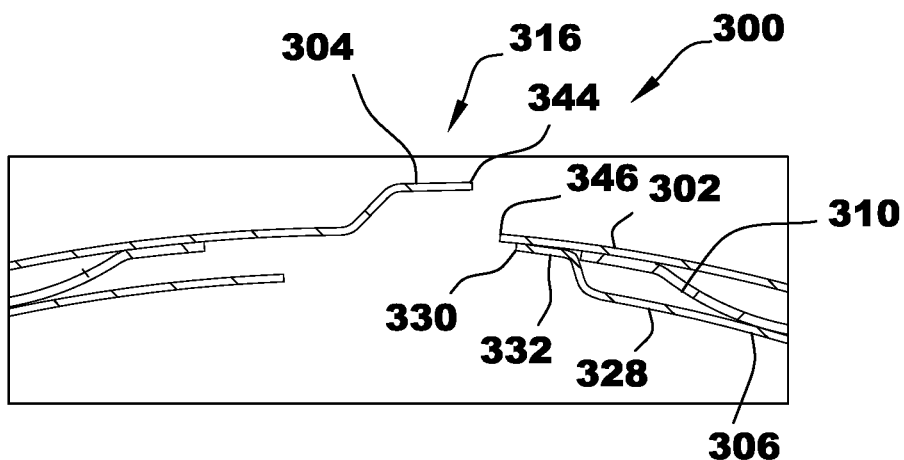
FIG. 16 is an enlarged view of the foil bearing assembly shown in FIG. 15, illustrating various features of the foil bearing assembly in more detail.

Referring to FIGS. 15 and 16, the foil bearing assembly 300 further includes at least one bearing retention feature 304 to cooperatively engage the bearing assembly locking feature 208 to maintain the foil bearing assembly within the bearing housing at a fixed rotational position within the cylindrical bore 206 of the sleeve 202. That is, the bearing retention feature 304 and the bearing assembly locking feature 208 are sized and shaped complementary to one another such that, when the bearing retention feature 304 is engaged with the bearing assembly locking feature 208, the bearing assembly locking feature 208 inhibits or limits at least rotational movement of the bearing retention feature 304. The at least one bearing retention feature 304 may include any suitable form of mechanically interlocking feature without limitation. In some embodiments, the at least one bearing retention feature 304 is selected based on the choice of bearing assembly locking feature 208 provided within the cylindrical bore 206. Non-limiting examples of suitable mechanically interlocking features include raised features such as an axial ridge, key, or tab, as well as axial depressions formed within at least the outer foil layer 302 of the foil bearing assembly 300 such as an axial slot, an axial keyhole or keeper.

The foil bearing assembly 300 of the illustrated embodiment includes a single bearing retention feature 304 formed along an edge of the outer layer 302. The bearing retention feature defines an axial tab 316 sized and dimensioned to interlock with the bearing assembly locking feature 208, provided in the form of an axial slot 208, as illustrated in FIG. 14. In other embodiments, the foil bearing assembly 300 may include additional bearing retention features 304 formed, for example, along an edge of the inner layer 306 (see, e.g., FIGS. 23 and 24). In such embodiments, the bearing retention features 304 formed along the outer and inner layers 302 and 306 may be positioned adjacent one another and/or joined together (e.g., by welding) to define the axial tab 316.

The foil bearing assembly 300 may be provided in any suitable form without limitation. For example, the foil bearing assembly 300 may be provided with two layers, three layers, four layers, or additional layers without limitation.

Figure 20:
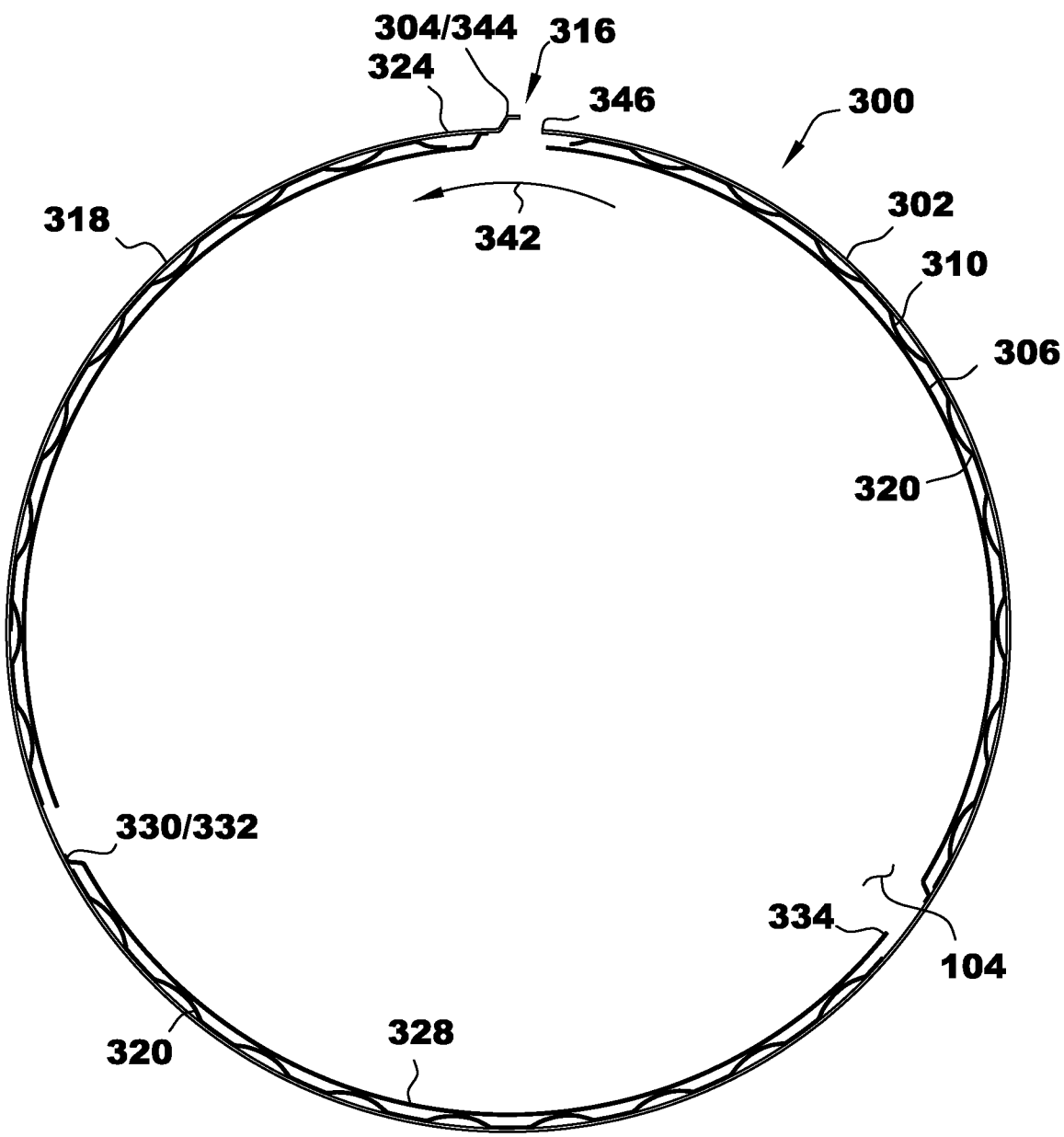
FIG. 20 is a front view of the foil bearing assembly shown in FIG. 15 with inner foil pads of the foil bearing assembly mounted in a different orientation than that shown in FIG. 15.
Figure 21:
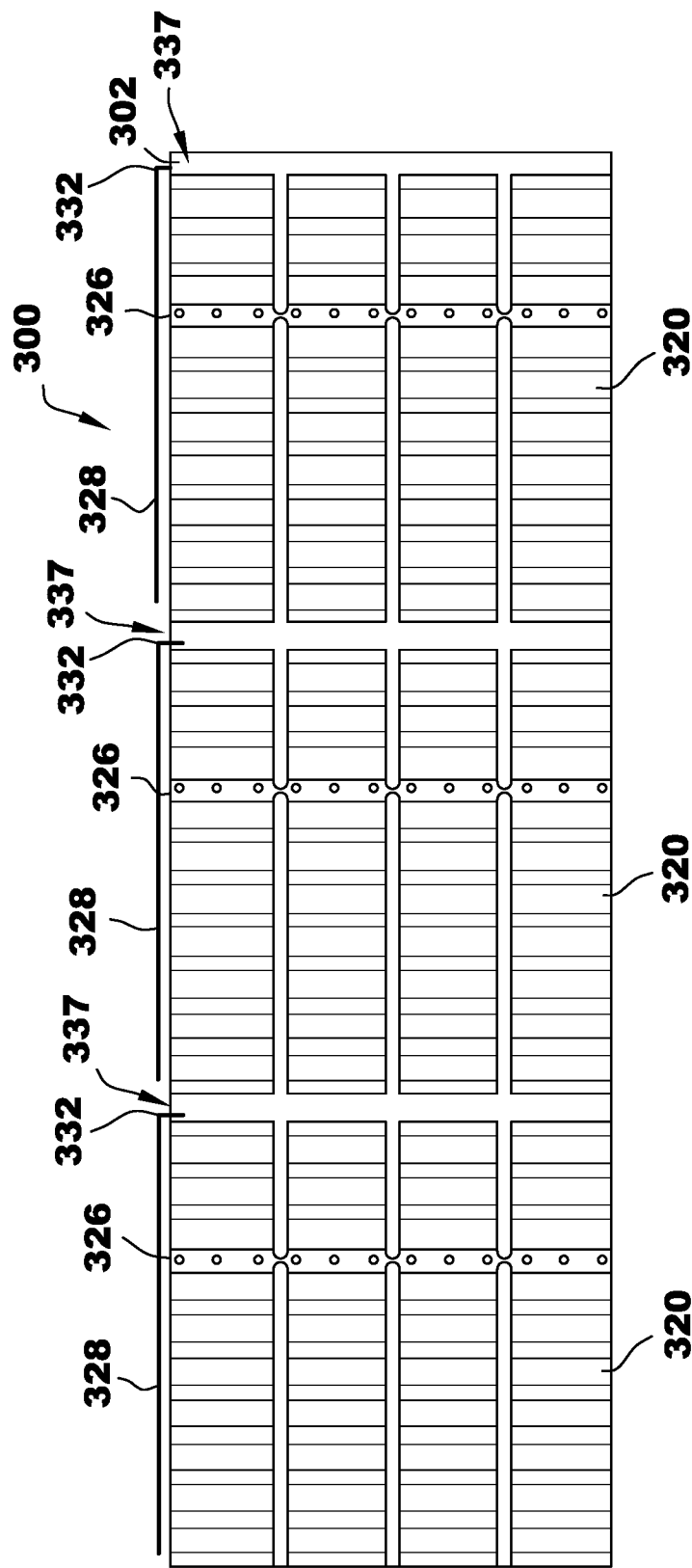
FIG. 21 is an interior view of the foil bearing assembly shown in FIG. 20 prior to the foil bearing assembly being formed into a cylinder.

The outer foil assembly 302 includes at least one outer foil pad 318. In the example embodiment illustrated in FIGS. 1-16, the outer foil assembly 302 includes a single outer foil pad 318 constructed of a single, unitary foil. In other embodiments, the outer foil assembly 302 may be constructed of multiple outer foil pads (see, e.g., FIGS. 20-22). The outer foil assembly 302 can provide a smooth inner surface for support of the adjacent bump foil assembly 310 for efficient transmission of transient motions caused by radial forces exerted by the driveshaft 104 to the inner foil assembly 306 during operation of the compressor 100. The outer foil assembly 302 provides this smooth inner surface independently of the surface smoothness of the underlying radial inner surface 204 of the cylindrical bore 206 of the bearing housing 200. Thus, in some embodiments, use of the outer foil assembly 302 facilitates increasing the surface specification of the radial inner surface 204 of the cylindrical bore 206 or, stated another way, reducing a surface smoothness requirement of the radial inner surface 204. In some embodiments, the foil bearing assembly 300 is suitable for use with a bearing housing 200 in an "as-cast" condition without need for further machining, grinding, or any other means to smooth the radial inner surface 204 of the cylindrical bore 206 of the bearing housing 200. Accordingly, in some embodiments, the radial inner surface 204 of the cylindrical bore 206 is an as-cast surface. That is, the radial inner surface 204 of the cylindrical bore 206 is a surface of a cast bearing housing 200 that has not undergone post-cast machining, grinding, or similar means to smooth the radial inner surface 204.

The outer foil assembly 302 can also improve thermal management of the foil bearing assembly 300 and facilitate reducing space requirements of the foil bearing assembly 300, as described for example in in U.S. patent application Ser. No. 16/809,836, filed Mar. 5, 2020, the disclosure of which is hereby incorporated by reference in its entirety.

The bump foil assembly 310 of the foil bearing assembly 300 may be formed from a radially elastic structure to provide a resilient surface for the spinning driveshaft 104 during operation of the compressor 100. The bump foil assembly 310 may be formed from any suitable radially elastic structure without limitation including, but not limited to, an array of deformable bumps or other features designed to deform and rebound under intermittent compressive radial loads, and any other elastically resilient material capable of compressing and rebounding under intermittent compressive radial loads. The bump foil assembly 310 may be connected to at least one adjacent layer including, but not limited to at least one of the outer foil assembly 302 and the inner foil assembly 306. In some embodiments, the bump foil assembly 310 may be connected to both the outer foil assembly 302 and the inner foil assembly 306. In other embodiments, the bump foil assembly 310 may be free-floating and not connected to any layer of the foil bearing assembly 300.

As shown in FIG. 15, the bump foil assembly 310 of the example embodiment includes a plurality of bump foils 320 spaced circumferentially about the foil bearing assembly 300. Each bump foil 320 extends axially the entire length or substantially the entire length of the foil bearing assembly 300, and extends circumferentially from a first edge 322 to a second edge 324. Each bump foil 320 extends or subtends an arc angle of approximately 110° from the first edge 322 to the second edge 324 in the illustrated embodiment, although the bump foils 320 may extend greater than or less than 110° around the foil bearing assembly 300 in other embodiments. Additionally, the bump foils 320 can have different arc angles from one another. In other embodiments, the bump foil assembly 310 may include a single bump foil that extends circumferentially around the entirety or substantially the entirety of the foil bearing assembly 300.

Each bump foil 320 includes an axially-extending land 326 located between the first edge 322 and the second edge 324. The bump foils 320 are secured to one or both of the outer foil assembly 302 and the inner foil assembly 306 along the land 326. In some embodiments, for example, each of the bump foils 320 is welded to the outer foil assembly 302 along a respective land 326.

The inner foil assembly 306 forms a cylindrical inner surface that closely fits the surface of the driveshaft 104, as illustrated in FIG. 15. The inner foil assembly 306 includes a plurality of separate or segmented inner foil pads 328 spaced circumferentially about the foil bearing assembly 300. The inner foil assembly 306 can include any suitable number of inner foil pads 328 that enables the foil bearing assembly 300 to function as described herein. The illustrated embodiment includes three inner foil pads 328, although other embodiments may include greater than or fewer than three inner foil pads 328. Each of the inner foil pads 328 is arcuate and extends circumferentially from a first end 330 including a tab 332 (shown in FIG. 16) to a second, free end 334.

Figure 17:
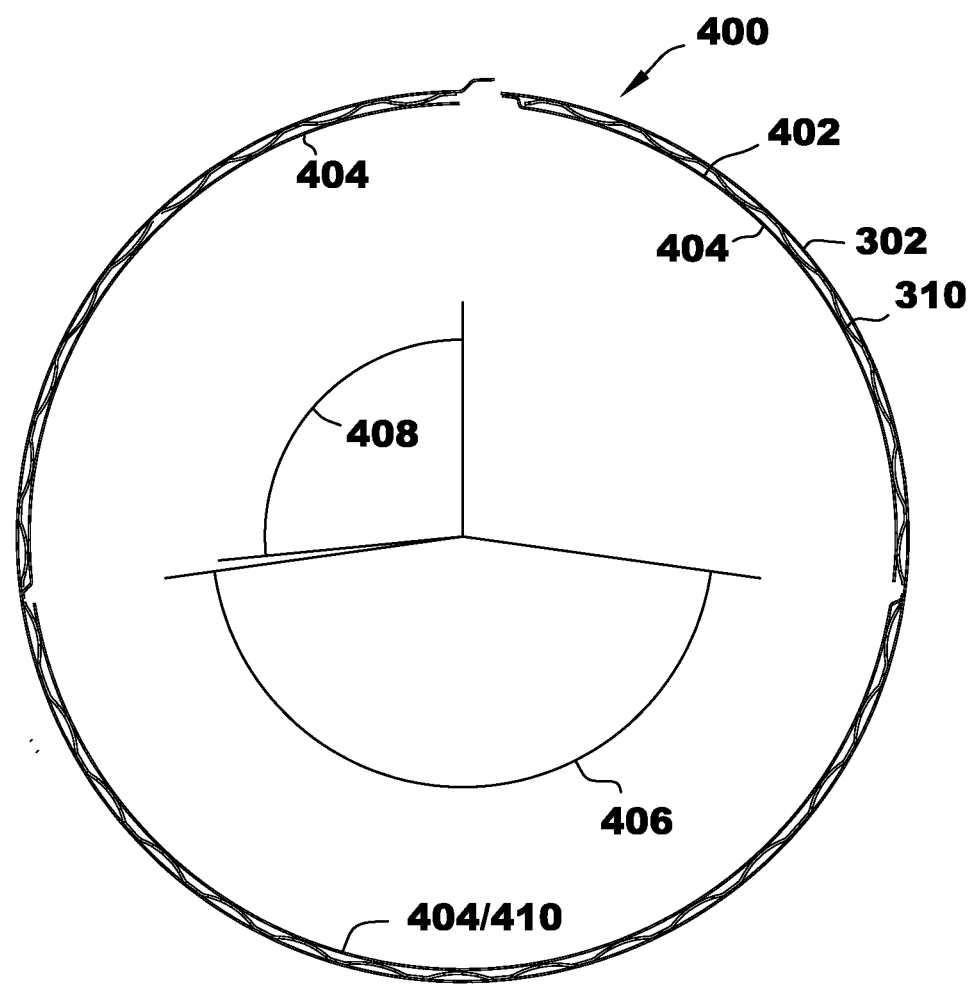
FIG. 17 is a front view of another foil bearing assembly suitable for use with the compressor of FIG. 1.

In the embodiment illustrated in FIG. 15, each inner foil pad 328 extends or subtends an arc angle 336 of approximately 110° around the foil bearing assembly 300. In other embodiments, each inner foil pad 328 may extend an arc angle 336 greater than or less than 110°. Additionally, in some embodiments, the inner foil pads 328 can have different arc angles from one another. FIG. 17, for example, illustrates a foil bearing assembly 400 including an inner foil assembly 402 with inner foil pads 404 having different arc angles 406, 408. In particular, the inner foil assembly 402 of FIG. 17 includes a major inner foil pad 410 that has an arc angle 406 greater than the arc angle 408 of the other inner foil pads 404. In this embodiment, the major inner foil pad 410 has an arc angle 406 of approximately 160°, and the other inner foil pads 404 have arc angles 408 of approximately 95°. In other embodiments, the major inner foil pad 410 can have an arc angle 406 in the range of 120° to 360°, in the range of 120° to 270°, in the range of 120° to 240°, in the range of 120° to 200°, in the range of 120° to 180°, in the range of 120° to 150°, in the range of 150° to 360°, in the range of 150° to 270°, in the range of 150° to 240°, in the range of 150° to 200°, or in the range of 150° to 180°.

Referring again to FIG. 15, each inner foil pad 328 is connected to the outer foil assembly 302 in the illustrated embodiment. In the example embodiment, each inner foil pad 328 is welded to the outer foil assembly 302, and the tabs 332 may therefore be interchangeably referred to as weld tabs. The tabs 332 may be welded to the outer foil assembly 302 using suitable welding techniques, such as resistance or spot welding, and laser welding. In other embodiments, the inner foil pads 328 may be connected to the outer foil assembly 302 using any other suitable fastening means. In yet other embodiments, one or more of the inner foil pads 328 may not be connected or fixed to the outer foil assembly 302. That is, one or more of the inner foil pads 328 can be detached from the outer foil assembly 302.

Figure 18:
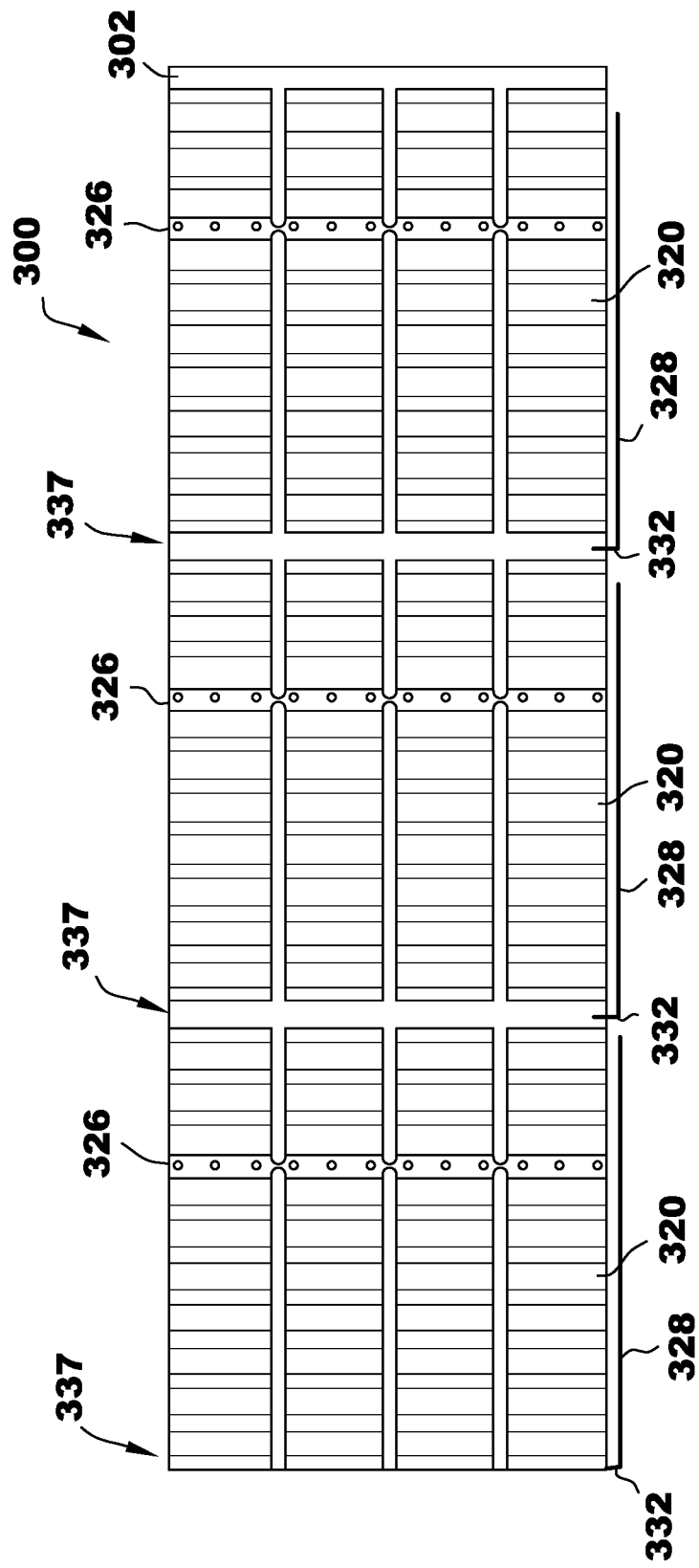
FIG. 18 is an interior view of the foil bearing assembly shown in FIG. 15 prior to the foil bearing assembly being formed into a cylinder.

The inner foil pads 328 can be welded or otherwise connected to the outer foil assembly 302 at any suitable location that enables the foil bearing assembly 300 to function as described herein. In the example embodiment, each inner foil pad 328 is welded to the outer foil assembly 302 along a respective weld tab 332 of the inner foil pad 328. As shown in FIGS. 15 and 16, the weld tab 332 of each inner foil pad 328 extends radially outward from the inner foil pad 328 through an opening defined between two adjacent bump foils 320, and into engagement with the outer foil assembly 302. FIG. 18 is an interior view of the foil bearing assembly 300 prior to the foil bearing assembly 300 being formed into a cylinder, and illustrates the weld locations 337 for the weld tabs 332 of the inner foil pads 328 (shown schematically in FIG. 18) between adjacent bump foils 320. The weld tabs 332 of the inner foil pads 328 are welded to a radial inner surface 338 (FIG. 15) of the outer foil pad 318 in the example embodiment. In other embodiments, the tab 332 of at least one of the inner foil pads 328 can be welded or positioned adjacent to the bearing retention feature 304 of the outer foil assembly 302.

Figure 19:
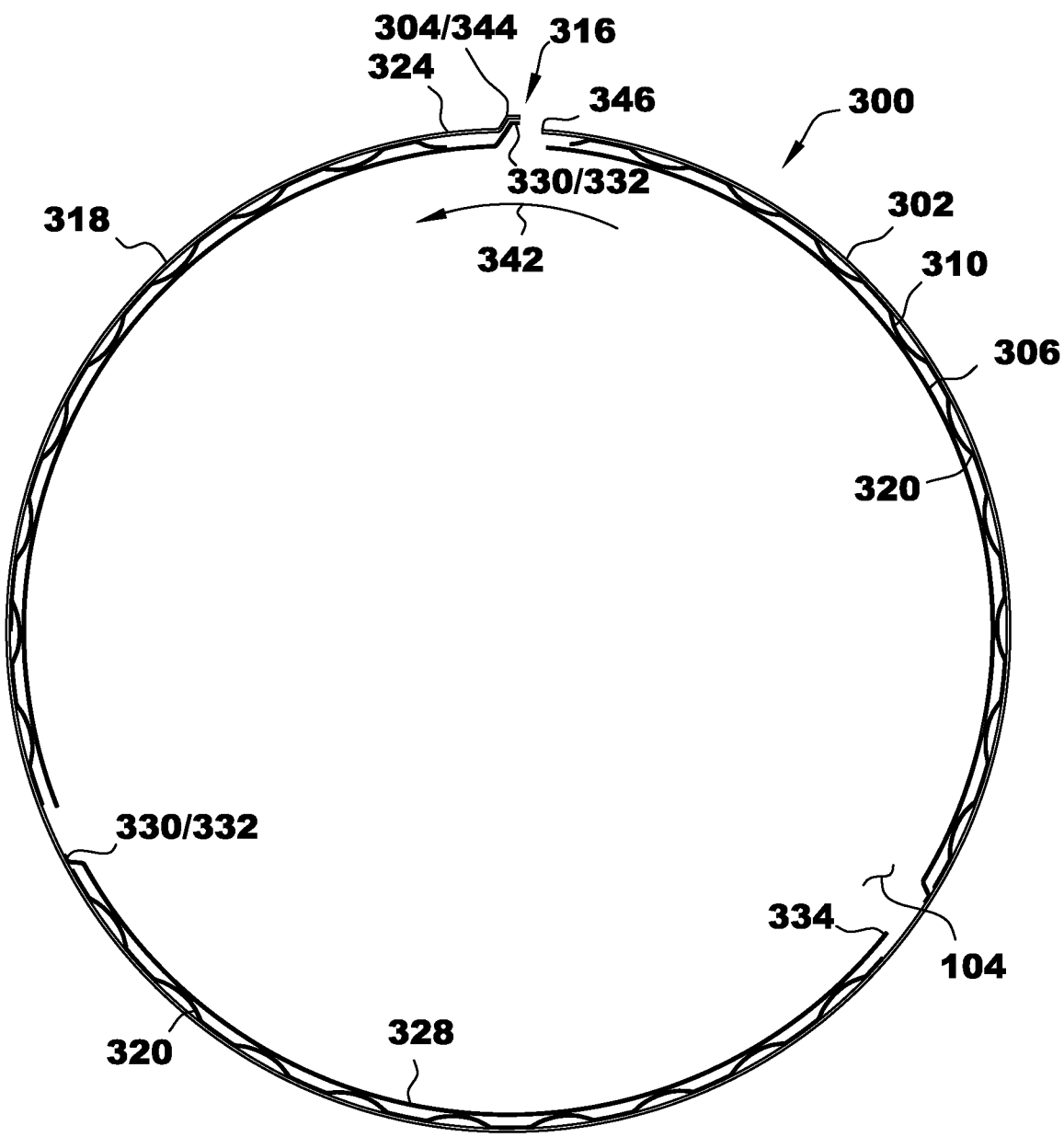
FIG. 19 is a front view of another foil bearing assembly suitable for use with the compressor of FIG. 1, with the tab of one of the inner foil pads of the foil bearing assembly positioned adjacent to a bearing retention feature of the outer foil assembly.
Figure 23:
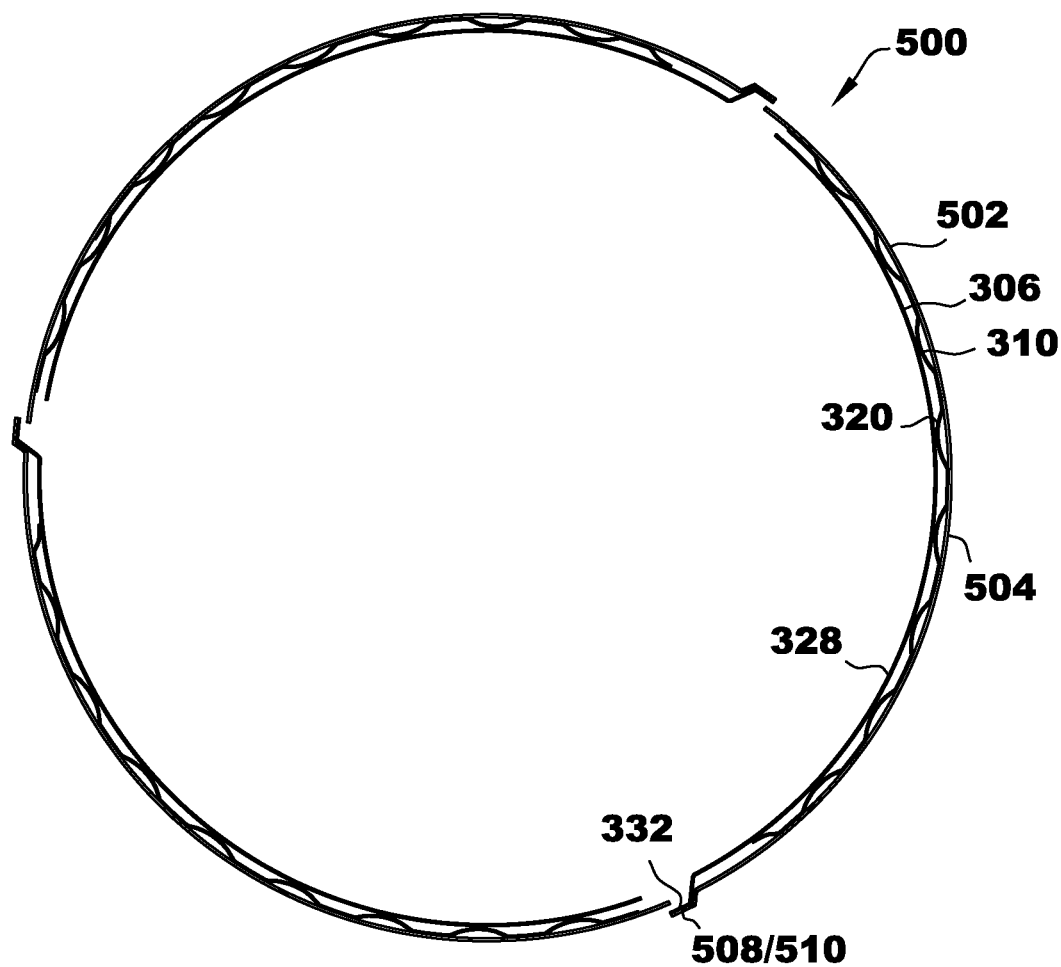
FIG. 23 is a front view of the foil bearing assembly shown in FIG. 22, with tabs of the inner foil pads of the foil bearing assembly positioned adjacent to a bearing retention feature of the outer foil pads.
Figure 24:
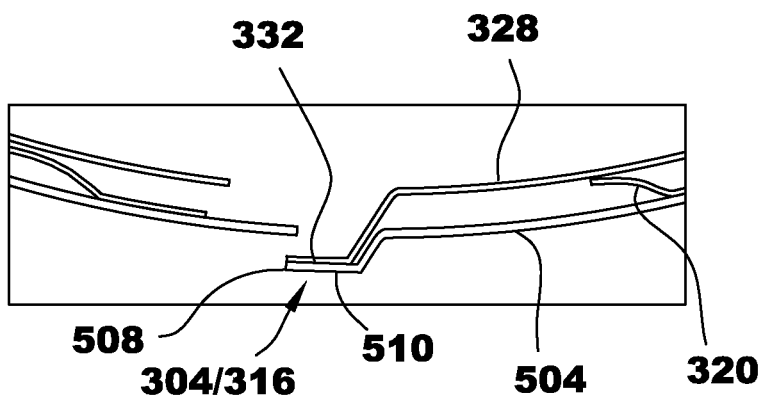
FIG. 24 is an enlarged view of the foil bearing assembly shown in FIG. 23, illustrating various features of the foil bearing assembly in more detail.

FIG. 19, for example, illustrates the foil bearing assembly 300 with the tab 332 of one of the inner foil pads 328 positioned adjacent to the bearing retention feature 304 of the outer foil assembly 302. In this embodiment, the tab 332 is not welded or otherwise fixed to the bearing retention feature 304. In other embodiments, the tab 332 may be connected to the bearing retention feature 304, for example, by welding. FIGS. 23 and 24 also illustrate tabs 332 of the inner foil pads 328 positioned adjacent to bearing retention features 304 of the outer foil assembly 302, as described in further detail herein.

In some embodiments, each of the inner foil pads 328 is secured or fixed to the foil bearing assembly 300 only along the weld tab 332 such that the free end 334 of the inner foil pad 328 is free to move or deflect. The free end 334 of the inner foil pad 328 can improve damping characteristics of the inner foil assembly 306, for example, by allowing greater deflection or freedom of movement of the inner foil assembly 306. Additionally, as shown in FIG. 15, the segmented inner foil pads 328 of the inner foil assembly 306 define axially-extending gaps 340 between adjacent inner foil pads 328. These gaps 340 create discontinuities along the radial inner surface of the inner foil assembly 306, which disrupts or interrupts the swirling fluid film around the driveshaft 104. These disruptions in the swirling fluid film facilitate reducing cross-coupling within the foil bearing assembly 300, and thereby facilitate reducing sub-synchronous vibrations.

The inner foil pads 328 can be mounted to the outer foil assembly 302 in any suitable orientation that enables the foil bearing assembly 300 to function as described herein. For example, the inner foil pads 328 can be mounted in an orientation that is the same as or opposite to the direction of rotation of the driveshaft 104. More specifically, the driveshaft 104 is configured for rotation about a rotational axis of the driveshaft 104 in a first direction (indicated by arrow 342 in FIG. 15) In the embodiment illustrated in FIG. 15, each of the inner foil pads 328 extends circumferentially from the tab 332 to the free end 334 in a second direction opposite the first direction 342. In other embodiments (see FIGS. 20 and 21, for example), each of the inner foil pads 328 can extend circumferentially from the tab 332 to the free end 334 in the same (first) direction 342 as the rotational direction of the driveshaft 104.

The inner foil pads 328 can also be mounted in the same orientation as the outer foil assembly 302, or in an opposite orientation than that of the outer foil assembly 302. For example, the outer foil pad 318 extends circumferentially from a first end 344 including the bearing retention feature 304 to a second end 346. In the embodiment illustrated in FIG. 15, the outer foil pad 318 extends circumferentially from the first end 344 to the second end 346 in a first direction, and each of the inner foil pads 328 extends circumferentially from the tab 332 to the free end 334 in a second direction opposite the first direction. In other embodiments (sees FIGS. 20 and 21, for example), the inner foil pads 328 can be oriented in the same direction as the outer foil pad or pads 318. That is, each of the inner foil pads 328 can extend circumferentially from the tab 332 to the free end 334 in the same (first) direction as the outer foil pad or pads 318.

Figure 22:
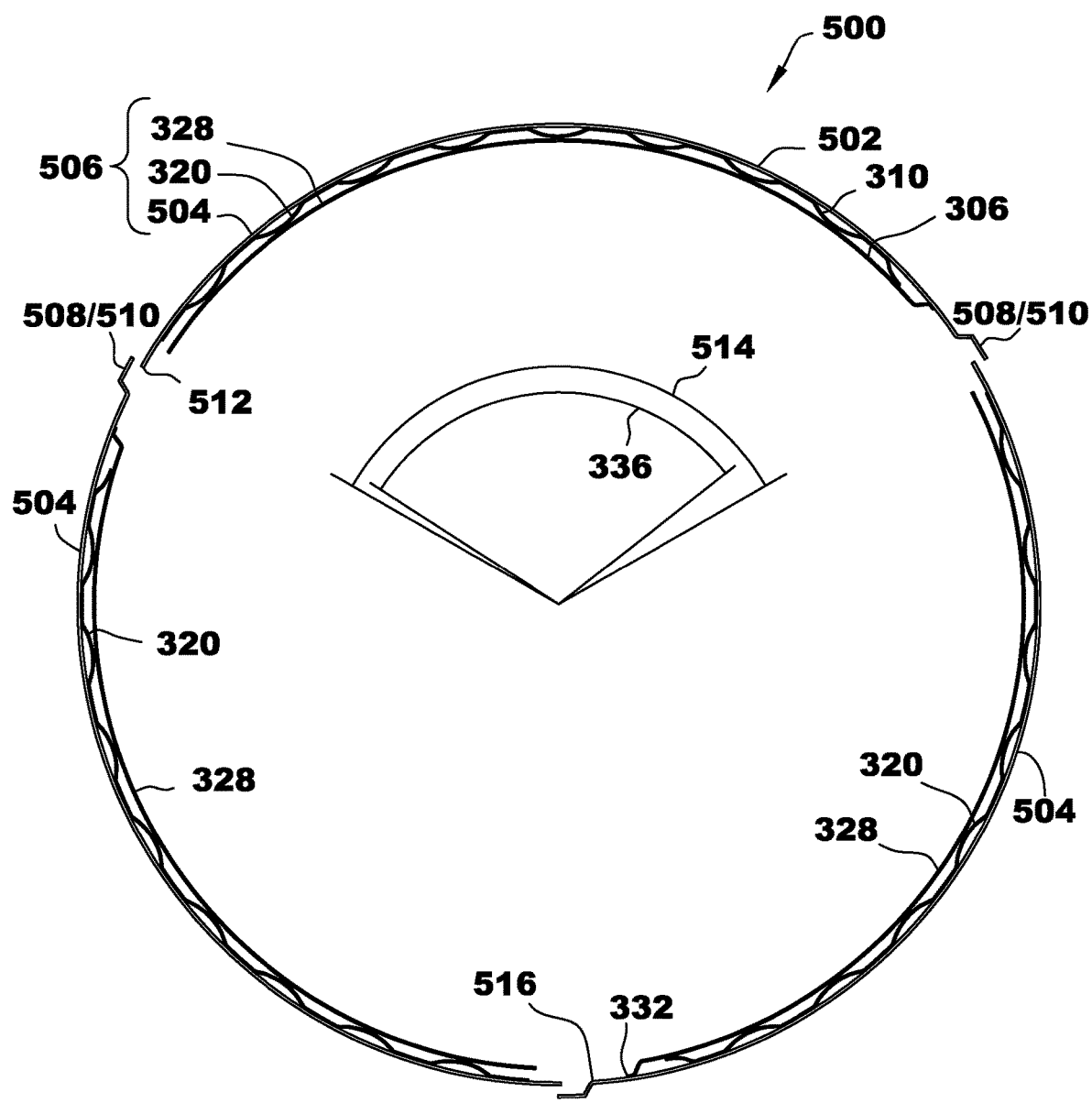
FIG. 22 is a front view of another foil bearing assembly suitable for use with the compressor of FIG. 1 including multiple or segmented outer foil pads.

FIG. 22 illustrates another embodiment of a foil bearing assembly 500 suitable for use with the compressor 100. In this embodiment, the foil bearing assembly 500 includes an outer foil assembly 502 that includes a plurality of separate, outer foil pads 504 spaced circumferentially about the foil bearing assembly 300. More specifically, the outer foil assembly 502 includes an outer foil pad 504 for each of the inner foil pads 328 of the inner foil assembly 306. Each of the inner foil pads 328 is attached or positioned adjacent to a corresponding one of the outer foil pads 504, with one of the bump foils 320 interposed or "sandwiched" between the outer foil pad 504 and the inner foil pad 328. In this arrangement, the outer foil pads 504, inner foil pads 328, and bump foils 320 define a plurality of pad modules 506, each pad module 506 including one of the outer foil pads 504, one of the inner foil pads 328, and one of the bump foils 320. The outer foil assembly 302 of this embodiment includes three outer foil pads 504 (corresponding to the three inner foil pads 328 of the inner foil assembly 306), although the outer foil assembly 302 can include greater than or fewer than three outer foil pads 504 in other embodiments.

Each outer foil pad 504 is arcuate and extends circumferentially from a first end 508 including a bearing retention feature 510 (e.g., bearing retention feature 304) to a second end 512. Each outer foil pad 504 extends or subtends an arc angle 514 approximately equal to the arc angle 336 of the corresponding inner foil pad 328 attached to the outer foil pad 504. In the embodiment illustrated in FIG. 22, for example, each inner foil pad 328 extends an arc angle 336 of approximately 110°, and each outer foil pad 504 extends an arc angle 514 of approximately 120°. In this embodiment, the second end 512 of each outer foil pad 504 overlaps the first end 508 of an adjacent outer foil pad 504. In other embodiments, the outer foil pads 504 may not overlap one another. In some embodiments, for example, each outer foil pad 504 may be separated from adjacent foil pads by a gap (e.g., similar to gap 340). Additionally, although the outer foil pads 504 are illustrated as all having the same arc angle 514 in FIG. 22, it should be understood that the outer foil pads 504 can have different arc angles from one another.

In the illustrated embodiment, each of the inner foil pads 328 is welded or otherwise connected to one of the outer foil pads 504. In the embodiment illustrated in FIG. 22, each of the inner foil pads 328 is welded to one of the outer foil pads 504 along the weld tab 332 of the inner foil pad 328. Further, in this embodiment, the weld tab 332 is welded along a radial inner surface 516 of the corresponding outer foil pad 504. In other embodiments, the tab 332 of each inner foil pad 328 can be welded or positioned adjacent to a different location of the outer foil pad 504. As illustrated in FIGS. 23 and 24, for example, the tab 332 of each inner foil pad 328 is positioned adjacent to the bearing retention feature 510 of the corresponding outer foil pad 504. In this embodiment, the tab 332 of each inner foil pad 328 acts as part of the bearing retention feature 304, defining a part of the axial tab 316 sized and dimensioned to interlock with a corresponding bearing assembly locking feature 208 of the bearing housing 200. In the embodiment illustrated in FIGS. 23 and 24, the tab 332 of each inner foil pad 328 is not welded to the bearing retention feature 510 of the corresponding outer foil pad 504. That is, the tab 332 of each inner foil pad 328 is detached from the corresponding outer foil pad 504. In such embodiments, the tab 332 of each inner foil pad 328 can be positioned adjacent to and/or in engagement with the bearing retention feature 510 of the corresponding outer foil pad 504, and inserted into a corresponding bearing assembly locking feature 208 of the bearing housing 200 to function as part of the axial tab 316. In other embodiments, the tab 332 of each inner foil pad 328 is welded or otherwise connected to the bearing retention feature 510.

The bearing housing and foil bearing assemblies of the present disclosure may be used as part of a method of assembling a compressor. The assembly method includes mounting the bearing housing to the compressor housing using the mounting structure of the bearing housing as described above. The assembly method also includes inserting a foil bearing assembly into the cylindrical bore and connecting the foil bearing assembly to the bearing housing by cooperatively engaging a bearing retention feature of the foil bearing assembly with the bearing assembly locking feature to maintain the foil bearing assembly within the bearing housing at a fixed rotational position as described above. In some embodiments, connecting the foil bearing assembly to the bearing housing includes connecting a plurality of separate pad modules, each having a separate bearing retention feature, to the bearing housing. The method further includes inserting at least one foil retaining clip into a circumferential groove formed within the inner surface of the cylindrical bore to retain the foil bearing assembly in a fixed axial position with respect to the cylindrical bore.

Embodiments of the systems and methods described achieve superior results as compared to prior systems and methods. In particular, bearing systems of the present disclosure facilitate reducing sub-synchronous vibrations (e.g., in centrifugal compressor systems) by incorporating segmented or multi-pad inner foil assemblies. Segmented inner foil assemblies of the present disclosure provide improved damping and reduced cross-coupled stiffness as compared to single-piece or unitary inner foil assemblies, thereby reducing sub-synchronous vibrations. For example, embodiments of the segmented inner foil assemblies form axially-extending discontinuities along the radial inner foil bearing surface, which disrupt or interrupt the swirling fluid film around the shaft, thereby reducing cross-coupling within the foil bearing assembly. Additionally, the multi-pad designs of the present disclosure facilitate tailoring characteristics of the inner foil assembly to enhance operation. For example, inner foil pads of the present disclosure may have different circumferential arc lengths, stiffnesses, and/or other characteristics based on a circumferential position of the inner foil pads.

Example embodiments of bearing systems and methods, such as refrigerant compressors that incorporate the disclosed bearing system and methods of assembling compressors that include the disclosed bearing assembly, are described above in detail. The systems and methods are not limited to the specific embodiments described herein, but rather, components of the system and methods may be used independently and separately from other components described herein. For example, the bearing housing and bearing assemblies described herein may be used in compressors other than refrigerant compressors, such as turbocharger compressors and the like.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A bearing system comprising:
    a bearing housing including:
        a sleeve defining a cylindrical bore and including at least one bearing assembly locking feature; and
        a mounting structure for connecting the bearing system to a compressor housing; and
    a foil bearing assembly positioned within the cylindrical bore and including:
    an outer foil assembly including an outer foil pad extending circumferentially from a first end including a bearing retention feature to a second end, the bearing retention feature cooperatively engaged with the at least one bearing assembly locking feature to maintain the foil bearing assembly within the bearing housing at a fixed rotational position;
    an inner foil assembly including a plurality of inner foil pads attached to the outer foil pad and supporting a driveshaft; and
    a bump foil assembly positioned directly between the outer foil pad and at least one of the inner foil pads;
    wherein the plurality of inner foil pads are spaced circumferentially about the foil bearing assembly, each inner foil pad extending circumferentially from a tab to a free end, wherein at least one of the inner foil pads is welded to the outer foil assembly along the tab, and wherein the inner foil assembly is the radially innermost component of the foil bearing assembly.

2. The bearing system of claim 1, wherein each of the inner foil pads is welded to the outer foil assembly along the tab.

3. The bearing system of claim 1, wherein the outer foil pad extends circumferentially from the first end to the second end in a first direction, and wherein each of the plurality of inner foil pads extends circumferentially from the tab to the free end in a second direction opposite the first direction.

4. The bearing system of claim 1, wherein the outer foil pad extends circumferentially from the first end to the second end in a first direction, and wherein each of the plurality of inner foil pads extends circumferentially from the tab to the free end in the first direction.

5. The bearing system of claim 1, wherein the bump foil assembly includes a plurality of bump foils, and wherein the tab of each inner foil pad extends radially outward from the inner foil pad through an opening defined between two adjacent bump foils and into engagement with the outer foil assembly.

6. The bearing system of claim 1, wherein the at least one bearing assembly locking feature includes an axially-extending slot defined within the sleeve, and wherein the bearing retention feature includes a tab that is received within the slot.

7. The bearing system of claim 1, wherein the mounting structure includes an annular flange extending radially outward from the sleeve.

8. The bearing system of claim 1, wherein the sleeve includes a radial inner surface that defines the cylindrical bore, wherein the radial inner surface is an as-cast surface.

9. A compressor comprising:
    a compressor housing;
    a driveshaft rotatably supported within the compressor housing;
    an impeller connected to the driveshaft and operable to impart kinetic energy to incoming refrigerant gas upon rotation of the driveshaft;
    a bearing housing mounted to the compressor housing and including a sleeve defining a cylindrical bore, wherein the sleeve includes at least one bearing assembly locking feature;
    a mounting structure projecting radially outward from the bearing housing to connect the compressor housing thereto; and
    a foil bearing assembly rotatably supporting the driveshaft and positioned within the cylindrical bore, the foil bearing assembly including:
    an outer foil assembly including an outer foil pad extending circumferentially from a first end including a bearing retention feature to a second end, the bearing retention feature cooperatively engaged with the at least one bearing assembly locking feature to maintain the foil bearing assembly within the bearing housing at a fixed rotational position;
    an inner foil assembly including a plurality of inner foil pads attached to the outer foil pad; and
    a bump foil assembly positioned directly between the outer foil pad and at least one of the plurality of inner foil pads, wherein the plurality of inner foil pads are spaced circumferentially about the foil bearing assembly, each inner foil pad extending circumferentially from a tab to a free end, and wherein at least one of the inner foil pads is welded to the outer foil assembly along the tab.

10. The bearing system of claim 9, wherein the tab of the at least one inner foil pad positioned adjacent to the bearing retention feature of the outer foil pad is welded to the bearing retention feature.

11. The compressor of claim 9, wherein each of the inner foil pads is welded to the outer foil assembly along the tab.

12. The compressor of claim 9, wherein the tab of at least one of the inner foil pads is positioned adjacent to the bearing retention feature.

13. The compressor of claim 12, wherein the tab of the at least one inner foil pad positioned adjacent to the bearing retention feature is detached from the outer foil assembly.

14. The compressor of claim 9, wherein the driveshaft is configured for rotation about a rotational axis of the driveshaft in a first direction, and wherein each of the plurality of inner foil pads extends circumferentially from the tab to the free end in a second direction opposite the first direction.

15. The compressor of claim 9, wherein driveshaft is configured for rotation about a rotational axis of the driveshaft in a first direction, and wherein each of the plurality of inner foil pads extends circumferentially from the tab to the free end in the first direction.

16. The compressor of claim 9, wherein the bump foil assembly includes a plurality of bump foils, and wherein the tab of each inner foil pad extends radially outward from the inner foil pad through an opening defined between two adjacent bump foils and into engagement with the outer foil assembly.

17. The compressor of claim 9, wherein the compressor comprises a first compression stage, a second compression stage, and a refrigerant transfer conduit to transfer compressed refrigerant from the first compression stage to the second compression stage.

18. The compressor of claim 9, further comprising a motor, wherein the sleeve extends axially into a portion of the motor.

19. A bearing system comprising:
a bearing housing including:
   a sleeve defining a cylindrical bore and including at least one bearing assembly locking feature; and
   a mounting structure for connecting the bearing system to a compressor housing; and
a foil bearing assembly positioned within the cylindrical bore and including:
   an outer foil assembly including at least one outer foil pad extending circumferentially from a first end including a bearing retention feature to a second end, the bearing retention feature cooperatively engaged with the at least one bearing assembly locking feature to maintain the foil bearing assembly within the bearing housing at a fixed rotational position;
   an inner foil assembly; and
   a bump foil assembly positioned between the outer foil assembly and the inner foil assembly;
wherein the inner foil assembly includes a plurality of inner foil pads spaced circumferentially about the foil bearing assembly, each inner foil pad extending circumferentially from a tab to a free end, wherein at least one of the inner foil pads is welded to the outer foil assembly along the tab, wherein the tab of at least one of the inner foil pads is positioned adjacent to the bearing retention feature of the at least one outer foil pad, and wherein the tab positioned adjacent to the bearing retention feature is detached from the at least one outer foil pad.

20. A bearing system comprising:
a bearing housing including:
a sleeve defining a cylindrical bore and including at least one bearing assembly locking feature; and
a mounting structure for connecting the bearing system to a compressor housing; and
a foil bearing assembly positioned within the cylindrical bore and including:
an outer foil assembly including at least one outer foil pad extending circumferentially from a first end including a bearing retention feature to a second end, the bearing retention feature cooperatively engaged with the at least one bearing assembly locking feature to maintain the foil bearing assembly within the bearing housing at a fixed rotational position;
an inner foil assembly including a plurality of inner foil pads supporting a driveshaft; and
a bump foil assembly positioned directly between the at least one outer foil pad and at least one of the inner foil pads;
wherein the plurality of inner foil pads are spaced circumferentially about the foil bearing assembly, each inner foil pad extending circumferentially from a tab to a free end, wherein at least one of the inner foil pads is welded to the outer foil assembly along the tab, and wherein the inner foil assembly is the radially innermost component of the foil bearing assembly, and
wherein the plurality of inner foil pads includes a major inner foil pad defining a first circumferential arc angle, and wherein the plurality of inner foil pads includes at least one other inner foil pad defining a second circumferential arc angle smaller than the first circumferential arc angle.

* * * * *